US007328889B2

(12) United States Patent
Mototsu

(10) Patent No.: US 7,328,889 B2
(45) Date of Patent: Feb. 12, 2008

(54) MEASURING UNIT, PARTITION MEMBER, MOLD FOR MOLDING THE PARTITION MEMBER, AND PRODUCTION METHOD FOR THE PARTITION MEMBER

(75) Inventor: Kazunori Mototsu, Kobe (JP)

(73) Assignee: Sysmex Corporation, Kobe-Shi (JP)

( * ) Notice: Subject to any disclaimer, the term of this patent is extended or adjusted under 35 U.S.C. 154(b) by 441 days.

(21) Appl. No.: 10/716,412

(22) Filed: Nov. 20, 2003

(65) Prior Publication Data

US 2004/0100627 A1 May 27, 2004

(30) Foreign Application Priority Data

Nov. 21, 2002 (JP) ............................ 2002-338573

(51) Int. Cl.
*F16F 13/00* (2006.01)
*B29C 45/00* (2006.01)
*G01N 1/00* (2006.01)

(52) U.S. Cl. .......................... 267/140.13; 267/140.14; 264/328.1; 356/246

(58) Field of Classification Search ................ 356/244, 356/72, 246; 250/237 G, 231 R; 267/140.12, 267/140.13, 140.14, 219; 604/403; 425/526, 425/130, 573; 264/250, 328.1, 247, 238.8
See application file for complete search history.

(56) References Cited

U.S. PATENT DOCUMENTS 4,063,086 A * 12/1977 Hirose .................... 250/237 G
4,111,660 A * 9/1978 Kabasawa et al. .......... 210/634
4,802,658 A * 2/1989 Ushijima et al. ...... 267/140.13
4,925,162 A * 5/1990 Kojima .................. 267/140.13
5,190,269 A * 3/1993 Ikeda et al. ............ 267/140.12
5,228,350 A 7/1993 Karpf et al.
5,246,434 A * 9/1993 Ebara ......................... 604/403
5,314,173 A * 5/1994 Ide et al. ............... 267/140.14
5,351,118 A * 9/1994 Spinell ........................ 356/72
5,445,515 A * 8/1995 Orimoto et al. ............ 425/526
5,681,529 A 10/1997 Taguchi et al.
6,406,672 B1 * 6/2002 Bhullar et al. .............. 422/101
6,409,158 B1 * 6/2002 Takashima et al. .... 267/140.13
6,443,438 B2 * 9/2002 Satori et al. ........... 267/140.13
6,631,894 B2 * 10/2003 Takashima et al. .... 267/140.14
7,070,724 B2 * 7/2006 Nakazawa .................. 264/250

FOREIGN PATENT DOCUMENTS

JP 9-304265 A 11/1997
JP 11-281564 A 10/1999

* cited by examiner

*Primary Examiner*—Sang H Nguyen
(74) *Attorney, Agent, or Firm*—Birch, Stewart, Kolasch & Birch, LLP

(57) ABSTRACT

A measuring unit is removably connected to a sample analyzer. The measuring unit includes a first member having a first channel through which a sample is allowed to pass, a second member having a second channel through which the sample is allowed to pass, and a partition member having a through-hole through which the sample is allowed to pass from the first channel to the second channel. The partition member includes a base having the through-hole and a projecting portion which projects from the base around the through-hole.

26 Claims, 32 Drawing Sheets

1a
2a
3a
4a
6a
11a
12a
8a
9a
13a
14c
37a
10a
15g
36a
35a
34a
15f
15d
33b
15e

MEASURING UNIT, PARTITION MEMBER, MOLD FOR MOLDING THE PARTITION MEMBER, AND PRODUCTION METHOD FOR THE PARTITION MEMBER

CROSS-REFERENCE TO RELATED APPLICATIONS

This application is related to Japanese patent application No. 2002-338573 filed on Nov. 21, 2002, whose priority is claimed under 35 USC § 119, the disclosure of which is incorporated by reference in its entirety.

BACKGROUND OF THE INVENTION

1. Field of the Invention

The present invention relates to a measuring unit, a partition member, a mold for molding the partition member, and a production method for the partition member.

2. Description of the Related Art

The following is known as the prior art related to the present invention.

Japanese Unexamined Patent Publication No. Hei 9-304265 (1997), for example, discloses a pellet for use in a particle detector to be incorporated in a particle counter of an electrical resistance type which is adapted to determine the number of particles in a particle suspension passing through a minute through-hole on the basis of a change in electrical characteristic occurring due to a difference in electrical impedance between the suspension and the particles. The pellet is produced by forming one or more minute through-holes in an electrically insulative plastic sheet or film by an excimer laser abrasion method, and has a predetermined shape around each of the minute through-holes.

Japanese Unexamined Patent Publication No. Hei 11-281564 (1999), for example, discloses a unitary pellet which comprises an orifice provided in a center portion thereof, conical slant portions provided on opposite sides of the orifice coaxially with the orifice, and one or more reinforcement members provided between rear surfaces of the slant portions.

An electrical resistance method is known as a method for electrically detecting the number and volume of particles suspended in an electrically conductive liquid. In the electrical resistance method, a channel for the particle suspension is divided by a partition member (pellet) having a minute through-hole, and a change in electrical resistance occurring when the particles pass through the through-hole is detected.

The resistance change ΔR and the volume Vp of the particles have the following relationship:

$$\Delta R=(\rho_o/S^2)Vp \quad (1)$$

wherein $\rho_o$ is the electrical resistance of the liquid, and S is the cross sectional area of the minute through-hole. For accurate determination of the volume Vp of the particles on the basis of the expression (1), it is necessary to form the minute-hole in the partition member with higher levels of dimensional accuracy and reproducibility.

Therefore, it is a conventional practice to employ artificial ruby or sapphire for the production of the partition member and achieve the formation of the minute through-hole by a laser machining process. However, the artificial ruby and sapphire are hard and, hence, not easy to machine.

Therefore, a partition member produced by employing a more easy-to-machine and softer material than the aforesaid hard material and a partition member reinforced by additionally providing a structural component are under consideration. However, these partition members are insufficient in performance and, hence, make it difficult to provide satisfactory measurement results when employed for the measurement by the electrical resistance method.

SUMMARY OF THE INVENTION

In view of the foregoing, the present invention provides a measuring unit which ensures accurate particle analysis, and provides a partition member, a mold for molding the partition member and a production method for the partition member.

In the first aspect, the present invention provides a measuring unit to be removably connected to a sample analyzer, the measuring unit comprising: a first member having a first channel through which a sample is allowed to pass; a second member having a second channel through which the sample is allowed to pass; and a partition member having a through-hole through which the sample is allowed to pass from the first channel to the second channel; wherein the partition member comprises a base having the through-hole and a projecting portion which projects from the base around the through-hole.

In the second aspect, the present invention provides a partition member provided in a detector for detecting a signal from a sample, the partition member comprising: a base having a through-hole through which the sample is allowed to pass; and a projecting portion which projects from the base around the through-hole.

In the third aspect, the present invention provides a mold for molding a partition member having a through-hole through which a sample is allowed to pass, the mold comprising: a male die including a core pin having a shape conformable to the through-hole; and a female die including a cavity having a shape conformable to the partition member; wherein the female die further includes a vent extending from the cavity to outside of the female die for degassing the cavity, and the cavity has an inlet of the vent located in opposed relation to the core pin.

In the fourth aspect, the present invention provides a method for molding a partition member having a through-hole through which a sample is allowed to pass, the method comprising the steps of: (a) combining a male die including a core pin having a shape conformable to the through-hole and a female die including a cavity having a shape conformable to the partition member; (b) supplying a fluidized material into the cavity; (c) solidifying the material in the cavity; (d) separating the male die and the female die, and unmolding the solidified material; wherein gas is expelled from the cavity at a position of the female die opposed to the core pin in the step (b).

DETAILED DESCRIPTION OF THE INVENTION

With reference to the attached drawings, the present invention will hereinafter be described in detail by way of an embodiment thereof. However, it should be understood that the invention be not limited to this embodiment.

1. Construction of Unit Body

Figure 1:
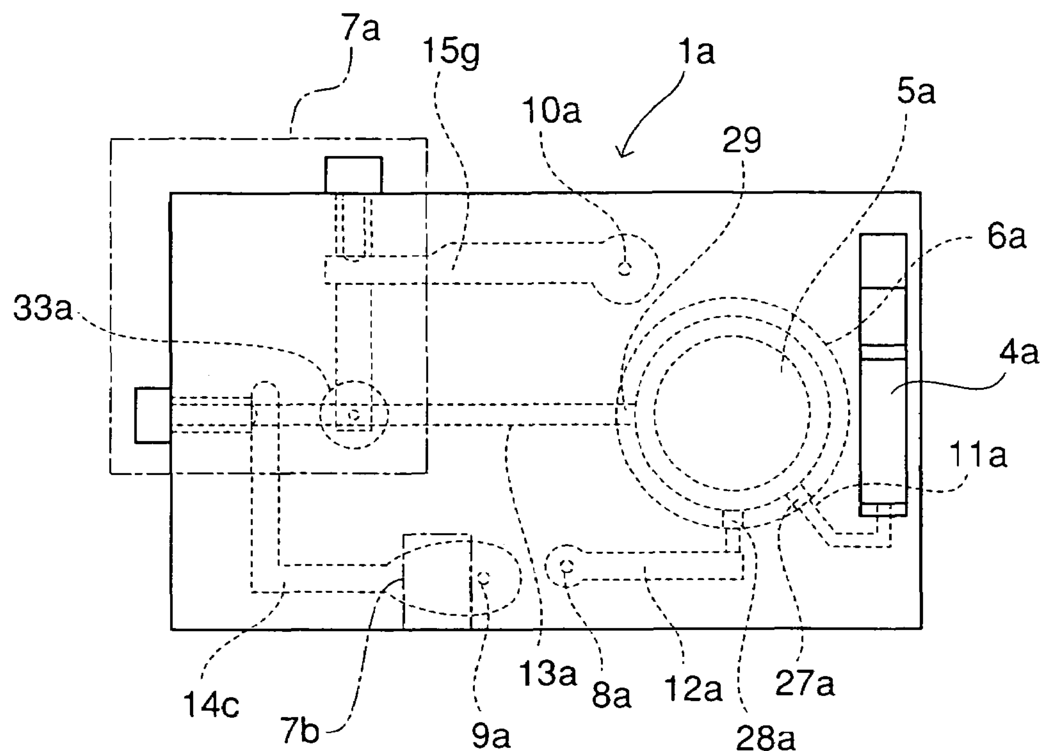
FIG. 1 is a top plan view of a measuring unit according to an embodiment of the present invention.
Figure 2:
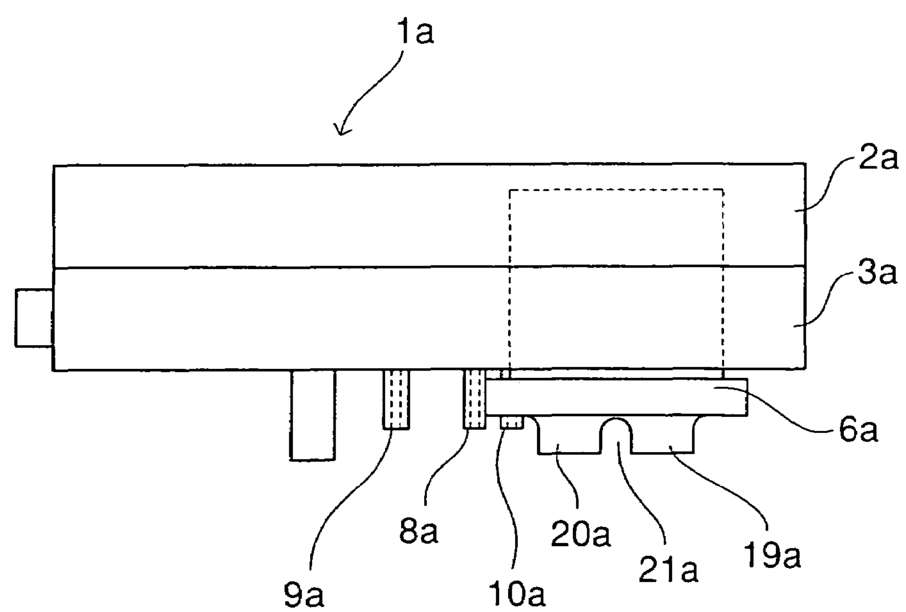
FIG. 2 is a front view of the measuring unit according to the embodiment.
Figure 3:
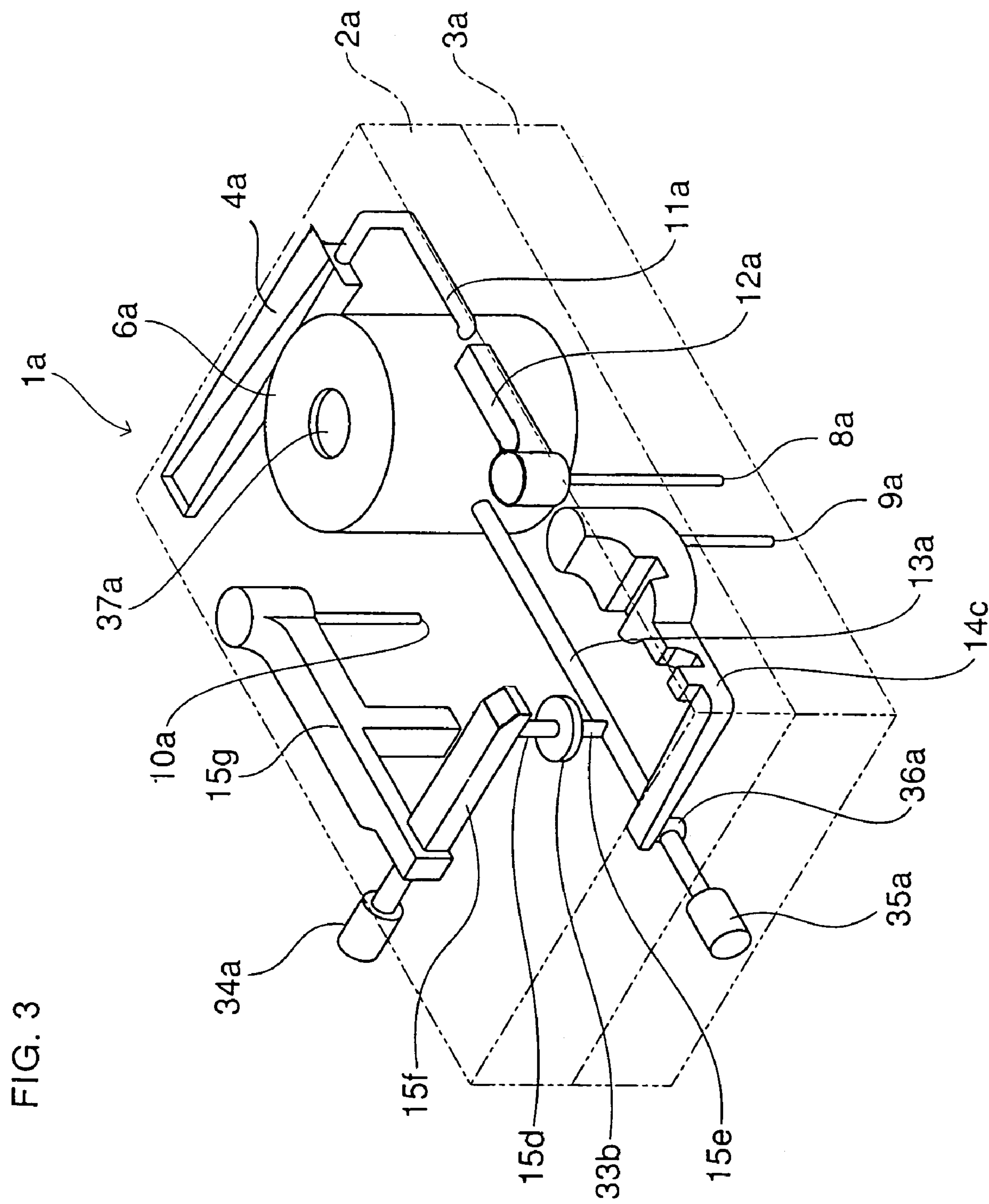
FIG. 3 is a perspective view illustrating the internal construction of the measuring unit according to the embodiment.

FIGS. 1 and 2 are a top plan view and a front view of a measuring unit according to an embodiment of the invention. FIG. 3 is a perspective view illustrating the internal construction of the measuring unit.

Figure 38:
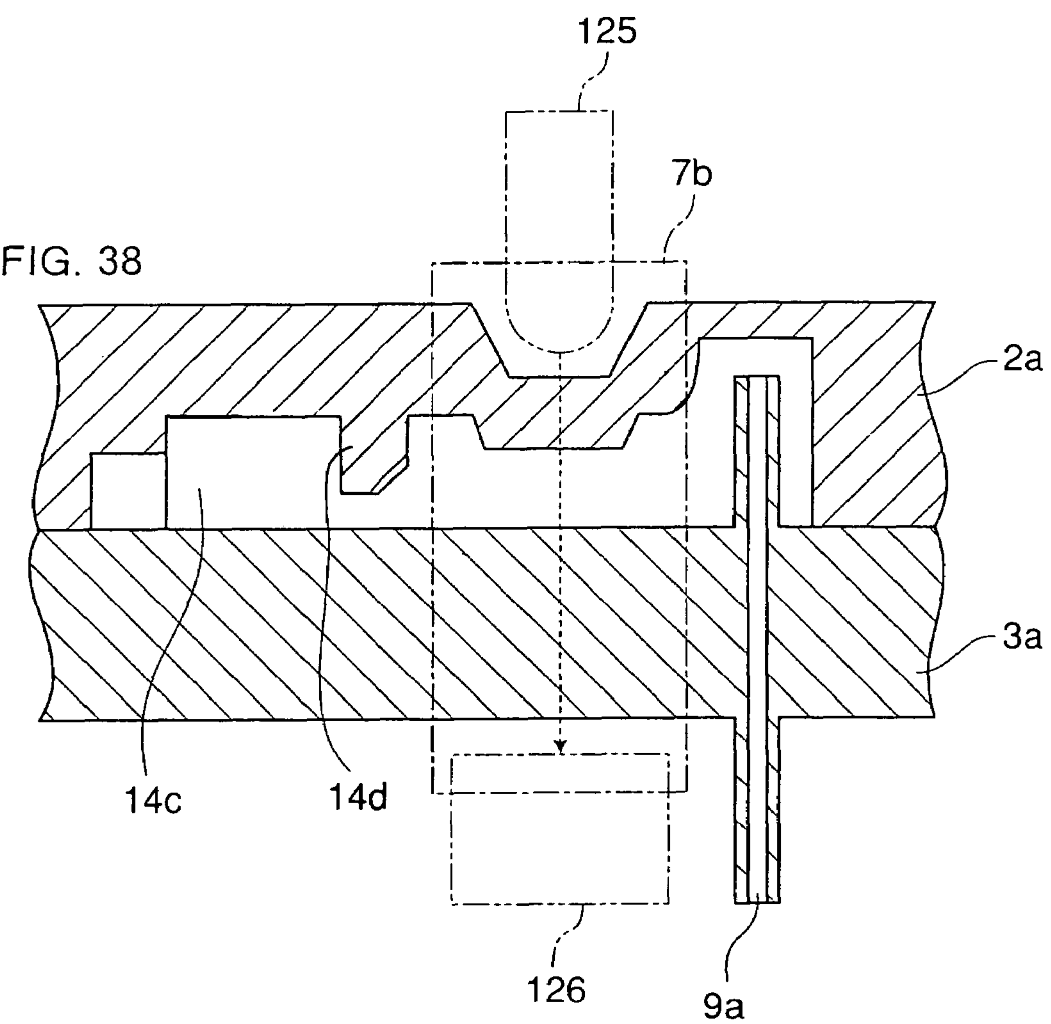
FIG. 38 is a sectional view illustrating a major portion of a channel of the measuring unit shown in FIG. 1.

As shown in FIGS. 1 to 3, a unit body 1*a* includes an upper plate 2*a* and a lower plate 3*a* each composed of a transparent resin (e.g., an acryl resin or a polycarbonate resin containing an antistatic agent). The unit body 1*a* includes: an elongated sample receiving section 4*a* having a volume of 200 μL for receiving a sample; a rotary valve 6*a* including a diluent container 5*a* incorporated therein, and having a sample metering function and a flow path switching function; an electrical resistance measuring section 7*a*; an optical characteristic measuring section 7*b*; and first, second and third pump connection ports 8*a*, 9*a* and 10*a*. The connection ports 8*a*, 9*a*, 10*a* are each constituted by pipes projecting upward and downward from the lower plate 3*a* as shown in FIG. 38. The pipes of the connection ports 8*a*, 9*a*, 10*a* projecting downward are respectively inserted into pump connection tubes, while the pipes of the connection ports 8*a*, 9*a*, 10*a* projecting upward prevent liquid in channels 12*a*, 14*c*, 15*g* from being sucked out through the connection ports 8*a*, 9*a*, 10*a*.

Figure 37:
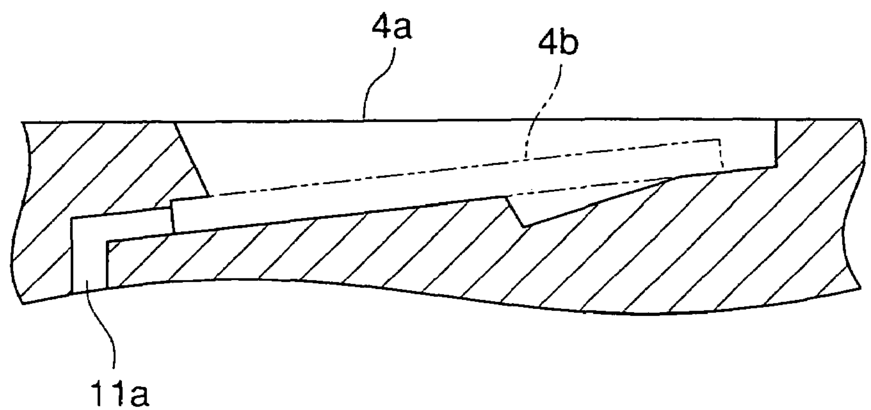
FIG. 37 is a sectional view illustrating a major portion of the measuring unit shown in FIG. 1.

The sample receiving section 4*a* has a sample injection port provided on the top thereof, and the bottom thereof is connected to the rotary valve 6*a* via a channel 11*a*. A capillary blood sampler 4*b* may be provided at the bottom of the sample receiving section 4*a* with a distal end thereof inserted in the channel 11*a* as shown in FIG. 37. The pump connection port 8*a* is connected to the rotary valve 6*a* via the channel 12*a*. The electrical resistance measuring section 7*a* and the optical characteristic measuring section 7*b* are connected to the rotary valve 6*a* via a channel 13*a*, to the pump connection port 9*a* via the channel 14*c*, and to the pump connection port 10*a* via the channel 15*g*.

As will be described later in detail, the channels 11*a*, 12*a* constitute a metering channel for introducing the sample to a sample metering section. The channel 13*a* constitutes a measuring channel for introducing a diluted sample from the diluent container 5*a* into the electrical resistance measuring section 7*a* and the optical characteristic measuring section 7*b*. Further, the channels 13*a*, 14*c* constitute an agitation channel for agitating a mixture of the metered sample and a diluent for preparation of the diluted sample. The channel 15*g* allows the electrical resistance measuring section 7*a* to communicate with the pump connection port 10*a* to constitute a retention channel for retaining the diluted sample introduced therein after measurement.

As shown in FIGS. 3 and 38, the channel 14*c* is configured so that the sectional area thereof becomes greater toward the pump connection port 9*a*, and has a projection 14*d* provided on an interior surface thereof. With this arrangement, bubbles generated when the mixture of the metered sample and the diluent is moved back and forth in arrow directions A and B for agitation thereof (to be described later with reference to FIG. 30) are prevented from flowing into the optical characteristic measuring section 7*b* (i.e., in the arrow direction A). Thus, occurrence of noises during measurement of an optical characteristic can be prevented.

2. Construction of Rotary Valve

Figure 4:
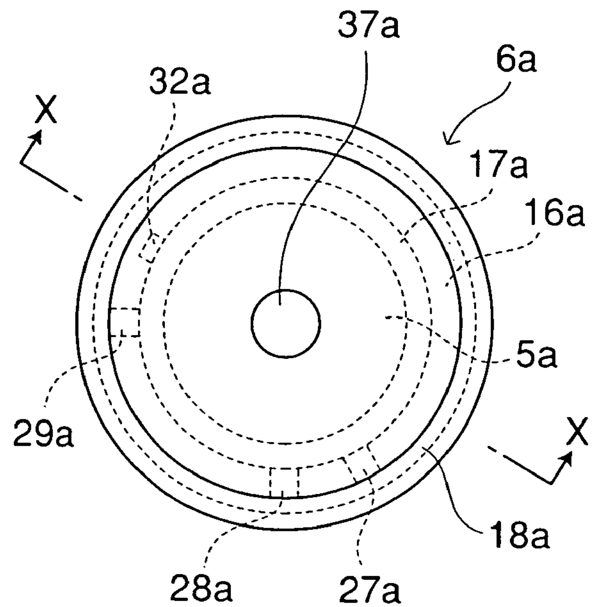
FIG. 4 is a top plan view of a rotary valve of the measuring unit according to the embodiment.
Figure 5:
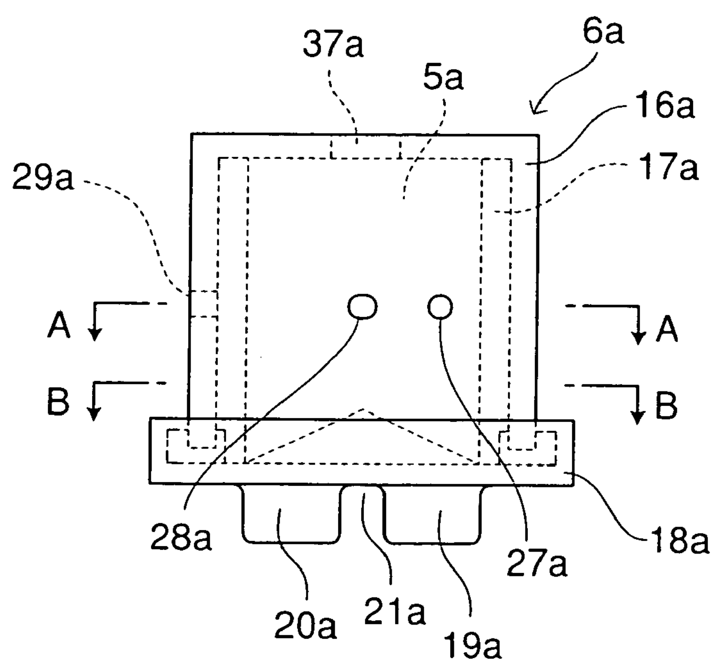
FIG. 5 is a front view of the rotary valve of the measuring unit according to the embodiment.
Figure 6:
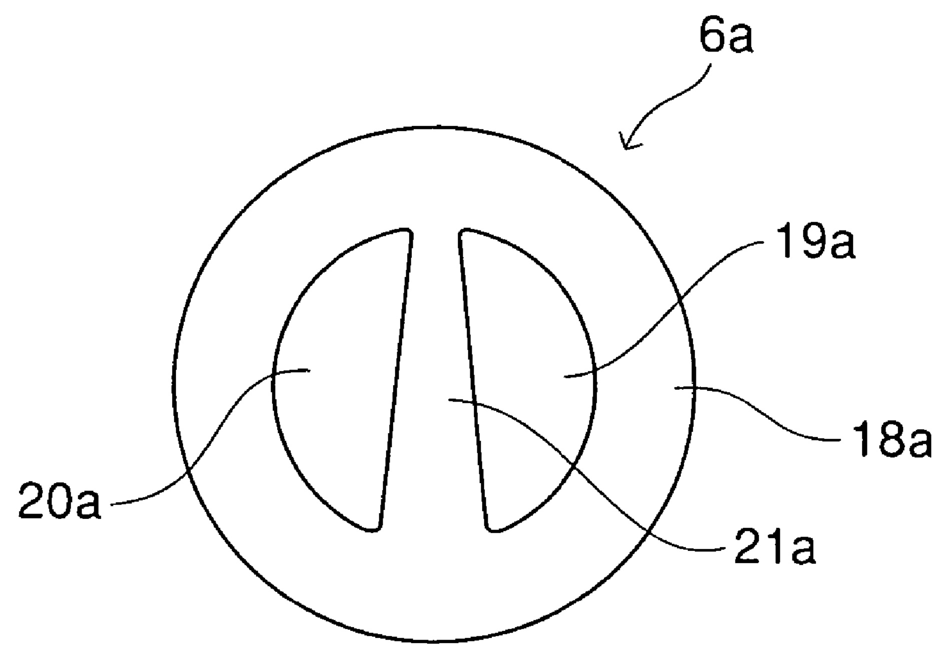
FIG. 6 is a bottom view of the rotary valve of the measuring unit according to the embodiment.

FIGS. 4, 5 and 6 are a top plan view, a front view and a bottom view, respectively, of the rotary valve 6*a*. As shown in FIGS. 4 to 6, the rotary valve 6*a* includes an outer cylinder 16*a* having an open bottom, and an inner cylinder 17*a* having a closed bottom and inserted in the outer cylinder 16*a* from the bottom of the outer cylinder 16*a*. The inner cylinder 17*a* has an open top, and a flange 18*a* provided at the bottom thereof. The outer cylinder 16*a* has a through-hole 37*a* formed in the center of the top thereof for opening the diluent container 5*a* to the atmosphere. The through-hole 37*a* is usually closed by a sealing member not shown, and opened when the unit body 1*a* is used.

Two projections 19*a*, 20*a* project downward from the flange 18*a* to define a groove 21*a* having non-parallel edges therebetween. The projections 19*a*, 20*a* constitute a connector to be connected to a valve driving source to be described later. When the inner cylinder 17*a* is rotated about an axis thereof, an outer circumferential surface of the inner cylinder 17*a* is slidable in contact with an inner circumferential surface of the outer cylinder 16*a*. Although the groove 21*a* has the non-parallel edges in this embodiment, the groove 21*a* may have parallel edges.

Figure 7:
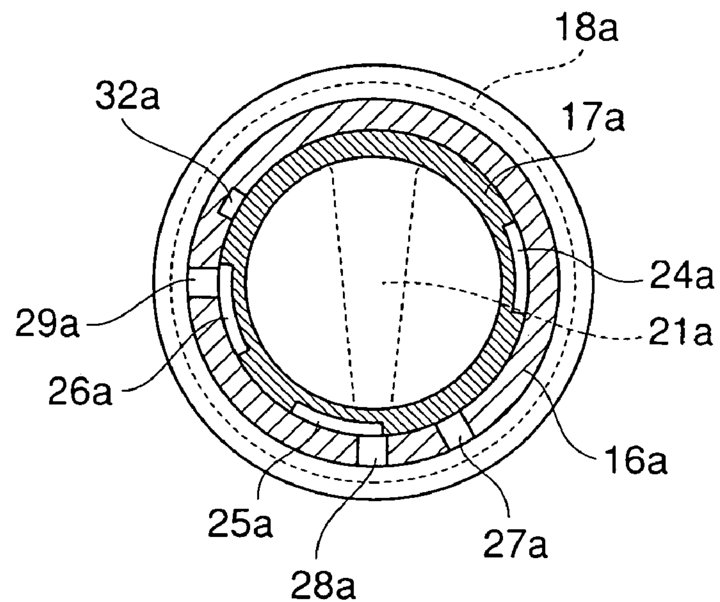
FIG. 7 is a sectional view of the rotary valve as seen in an arrow direction A-A in FIG. 5.
Figure 8:
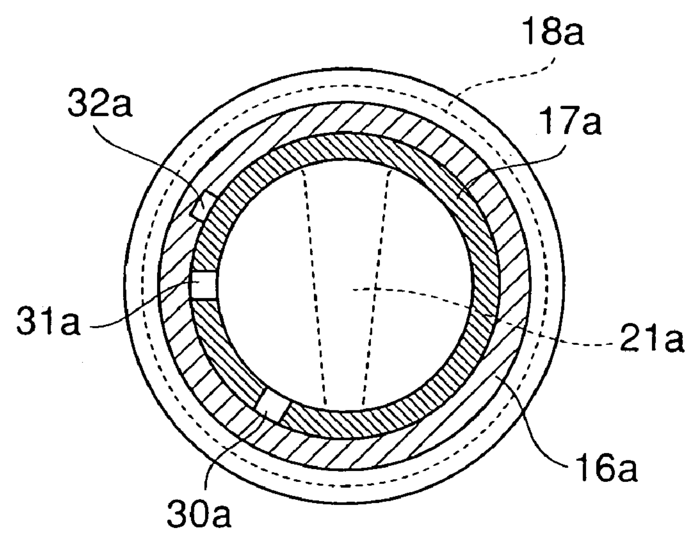
FIG. 8 is a sectional view of the rotary valve as seen in an arrow direction B-B in FIG. 5.
Figure 9:
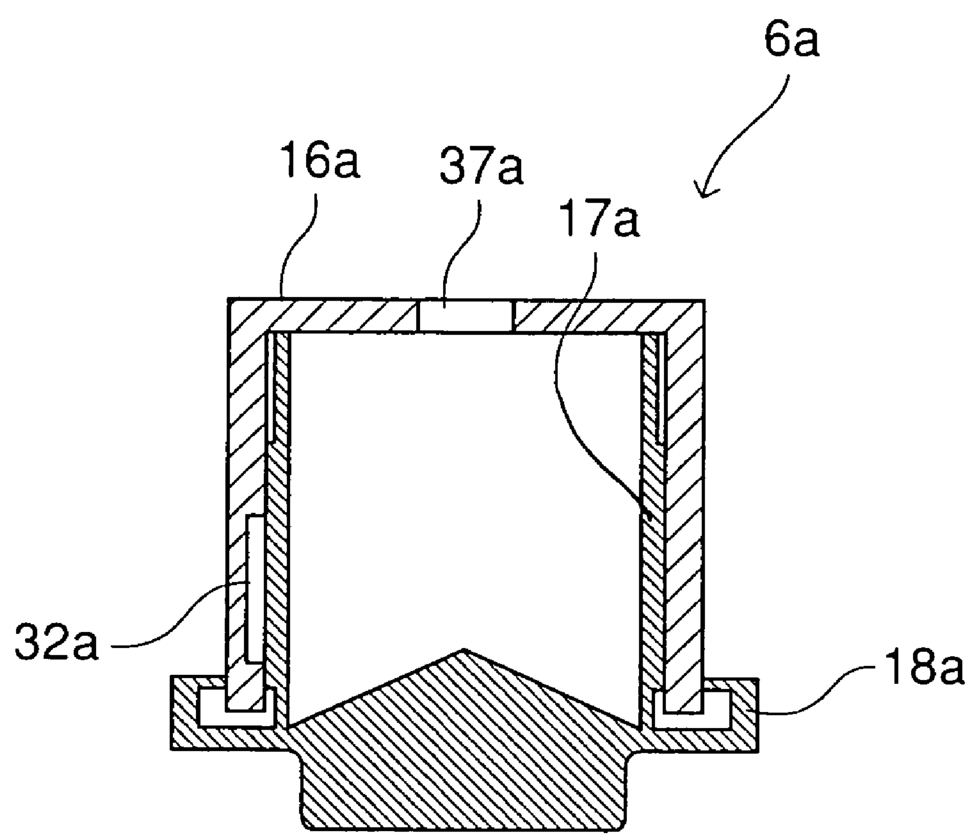
FIG. 9 is a sectional view of the rotary valve as seen in an arrow direction X-X in FIG. 4.

FIGS. 7 and 8 are sectional views of the rotary valve 6*a* as seen in arrow directions A-A and B-B, respectively, in FIG. 5. FIG. 9 is a sectional view of the rotary valve 6*a* as seen in an arrow direction X-X in FIG. 4.

As shown in FIG. 7, the inner cylinder 17*a* has three elongated lateral grooves 24*a*, 25*a*, 26*a* formed in circumferentially aligned relation in an upper portion of the outer circumferential surface thereof, and the outer cylinder 16*a* has three through-holes 27*a*, 28*a* and 29*a* communicating with the channels 11*a*, 12*a* and 13*a*, respectively.

As will be described later, the lateral groove 25*a* serves as the sample metering section, and the lateral grooves 24*a*, 26*a* serve as channel opening and closing grooves.

As shown in FIG. 8, the inner cylinder 17*a* has two through-holes 30*a*, 31*a* formed in a lower portion thereof for channel opening and closing. As shown in FIGS. 7 to 9, the outer cylinder 16*a* further has an elongated vertical groove 32*a* formed in the inner circumferential surface thereof as extending axially from an upper portion to a lower portion thereof.

Figure 11:
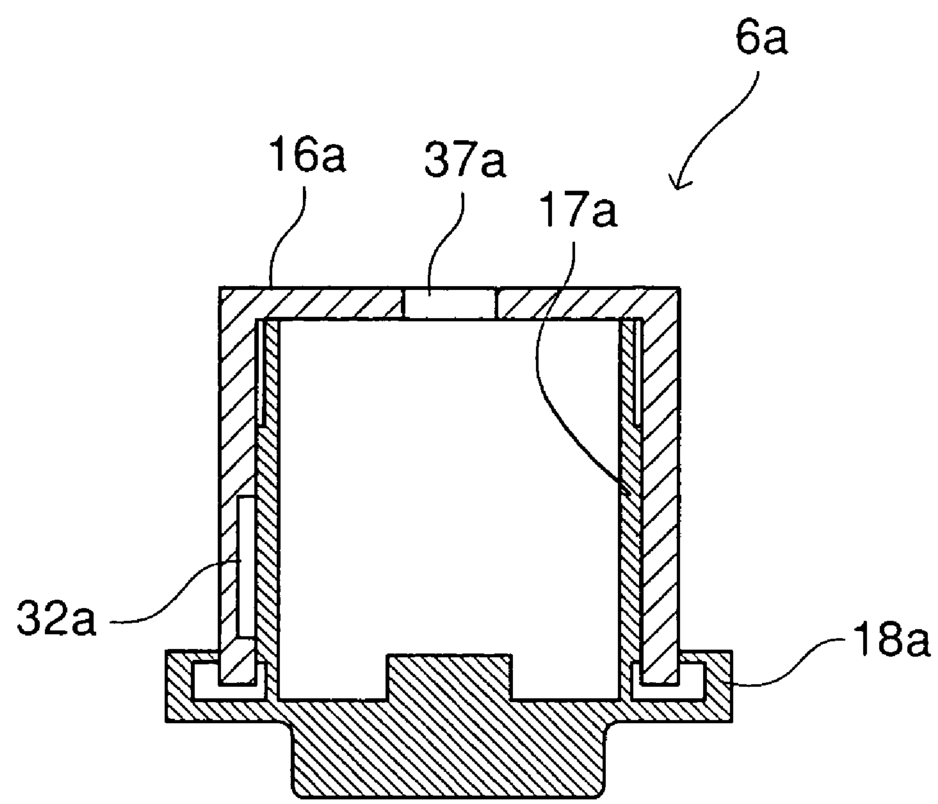
FIG. 11 is a sectional view illustrating a modification of the rotary valve.

As shown in FIG. 9, the inner cylinder 17*a* has an inwardly projecting conical bottom, which improves the efficiency of mixing the blood sample with the diluent in the inner cylinder 17*a* and makes it possible to completely discharge the sample. Alternatively, the inner cylinder 17*a* may have a cylindrical projection provided in the center portion of the bottom thereof as shown in FIG. 11. As shown in FIGS. 9 and 11, the outer peripheral edge of the flange 18*a* projects upward in a ring shape. With this arrangement, liquid which happens to leak through the side face of the inner cylinder 17*a* is retained in the flange 18*a*. A gap is defined between parts of the outer cylinder 16*a* and the inner cylinder 17*a*. This alleviates a load exerted on a stepping motor 105*a* during the rotation of the inner cylinder 17*a*.

3. Construction of Electrical Resistance Measuring Section

As shown in FIGS. 1 and 3, the electrical resistance measuring section 7*a* includes a disk-shaped partition member (pellet) 33*b* provided between vertical portions 15*d* and 15*e* of an internal channel 15*f* thereof, an electrode 34*a* provided in a junction between the channels 15*g* and 15*f* with a distal end thereof exposed to the inside of the channel, and an electrode 35*a* provided in a junction 36*a* between the channels 13*a* and 14*c* with a distal end thereof exposed to the inside of the channel.

Figure 10:
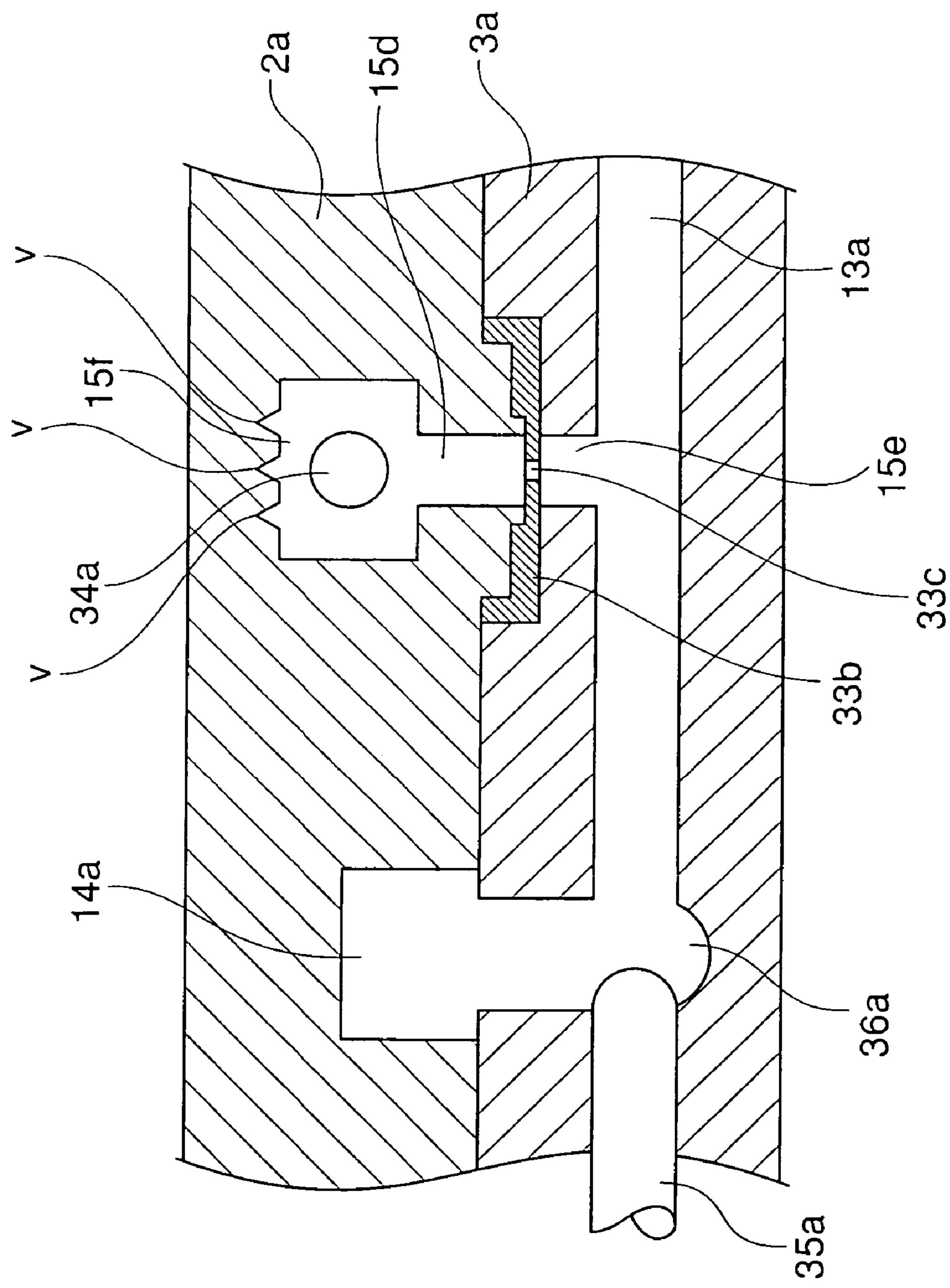
FIG. 10 is a sectional view illustrating a major portion of an electrical resistance measuring section of the measuring unit according to the embodiment.

FIG. 10 is a sectional view illustrating a major portion of the electrical resistance measuring section 7*a*. The pellet 33*b* is fitted in a round recess formed in the lower plate 3*a* coaxially with the vertical portion 15*e* and pressed by a round projection provided on the upper plate 2*a* coaxially with the vertical portion 15*d*.

The pellet 33*b* has a minute through-hole 33*c* formed in the center thereof, so that the electrical resistance of an electrolytic solution passing through the minute through-hole 33*c* is measured by the electrodes 34*a*, 35*a*.

As shown in FIG. 10, a plurality of grooves V are formed in an upper wall surface (ceiling surface) of the channel 15*f* as extending parallel to each other longitudinally of the channel 15*f*. With this arrangement, bubbles in the electrolytic solution flowing through the minute through-hole 33*c* in the channel 15*f* are trapped by the grooves V, and the electrolytic solution is rectified for stabilization of the flow thereof. This suppresses noises in measurements obtained by means of the electrodes 34*a*, 35*a*.

4. Construction of Optical Characteristic Measuring Section

As shown in FIG. 1, the optical characteristic measuring section 7*b* is located in the vicinity of the pump connection port 9*a* of the channel 14*c*. In the optical characteristic measuring section 7*b*, the channel 14*c* is configured so that a light emitting diode 125 and a photodiode 126 of the analyzer (to be described later) can be provided on upper and lower sides of the channel 14*c* as shown in FIG. 38 for measurement of the intensity of light transmitted through liquid present in the channel 14*c*.

5. Analyzer

Figure 12:
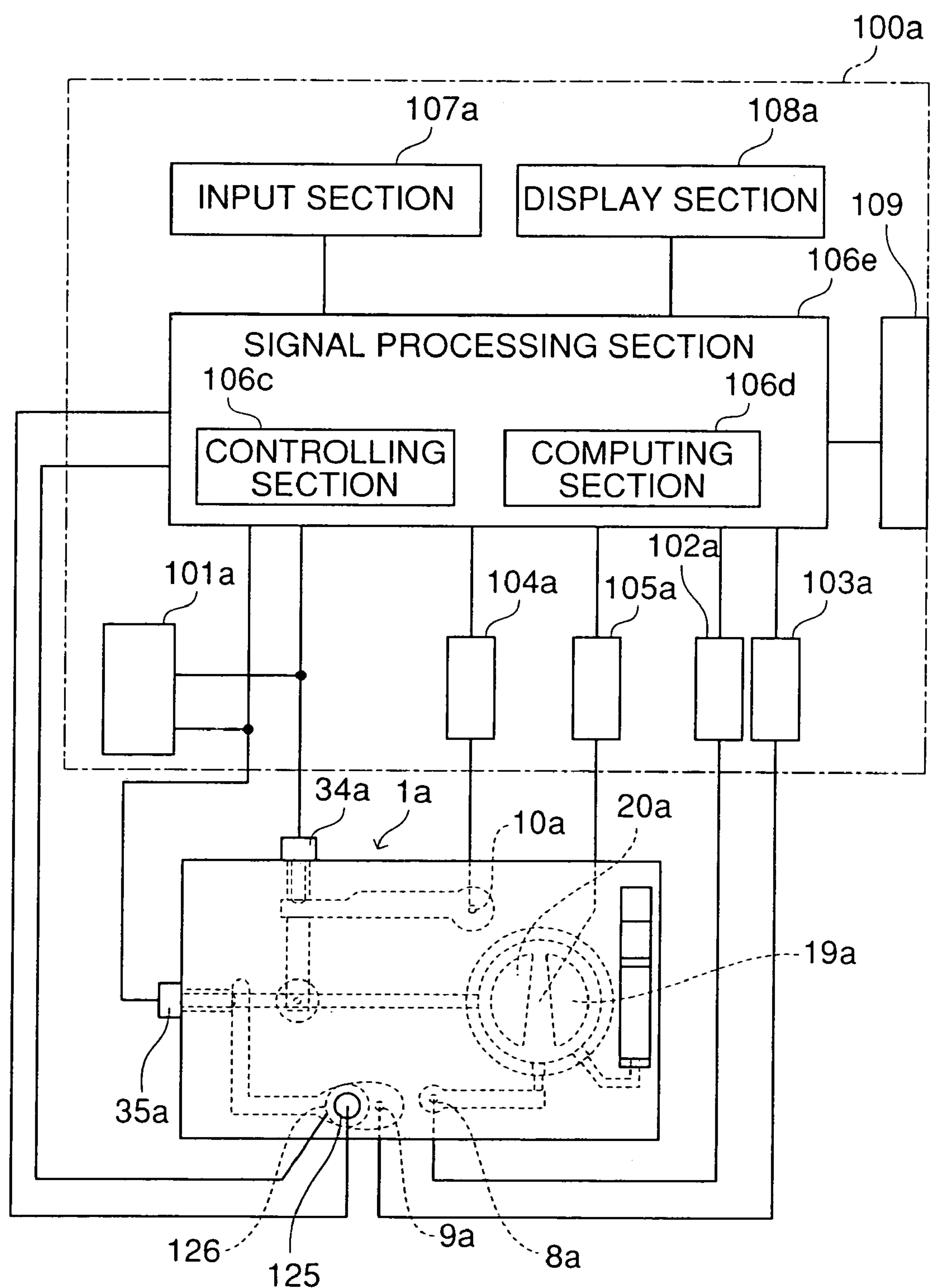
FIG. 12 is a block diagram illustrating the construction of an analyzer according to the embodiment.

FIG. 12 is a block diagram illustrating the construction of an analyzer 100*a* which analyzes white blood cells and hemoglobin in a blood sample with the use of the unit body 1*a*. A constant direct current source 101*a* of the analyzer 100 is connected to the electrodes 34*a*, 35*a* of the unit body 1*a*, and electric syringe pumps 102*a*, 103*a* and 104*a* are connected to the first, second and third pump connection ports 8*a*, 9*a* and 10*a*, respectively. A stepping motor 105*a* for driving the valve 6*a* is detachably connected to the valve 6*a* via a connector (not shown) engaged with the groove 21*a* formed in the flange 18*a* at the bottom of the valve 6*a*.

A signal processing section 106*e* includes a controlling section 106*c* and a computing section 106*d*, which are comprised of a microprocessor. The controlling section 106*c* drives the electric syringe pumps 102*a*, 103*a*, 104*a*, the stepping motor 105*a* and the light emitting diode 125 in response of a command applied thereto from an input section 107*a*. The computing section 106*d*counts the number of the white blood cells and calculates the size of each of the white blood cells on the basis of signals applied from the electrodes 34*a*, 35*a*. Further, the computing section 106*d* calculates the amount of the hemoglobin on the basis of signals from the photodiode 126. The results of the calculations are displayed on a display section 108*a*.

The analyzer 100*a* further includes an input/output port (interface) 109 for interfacing the signal processing section 106*e* with an external computer and printer for signal reception and transmission.

6. Measuring Operation

Figure 13:
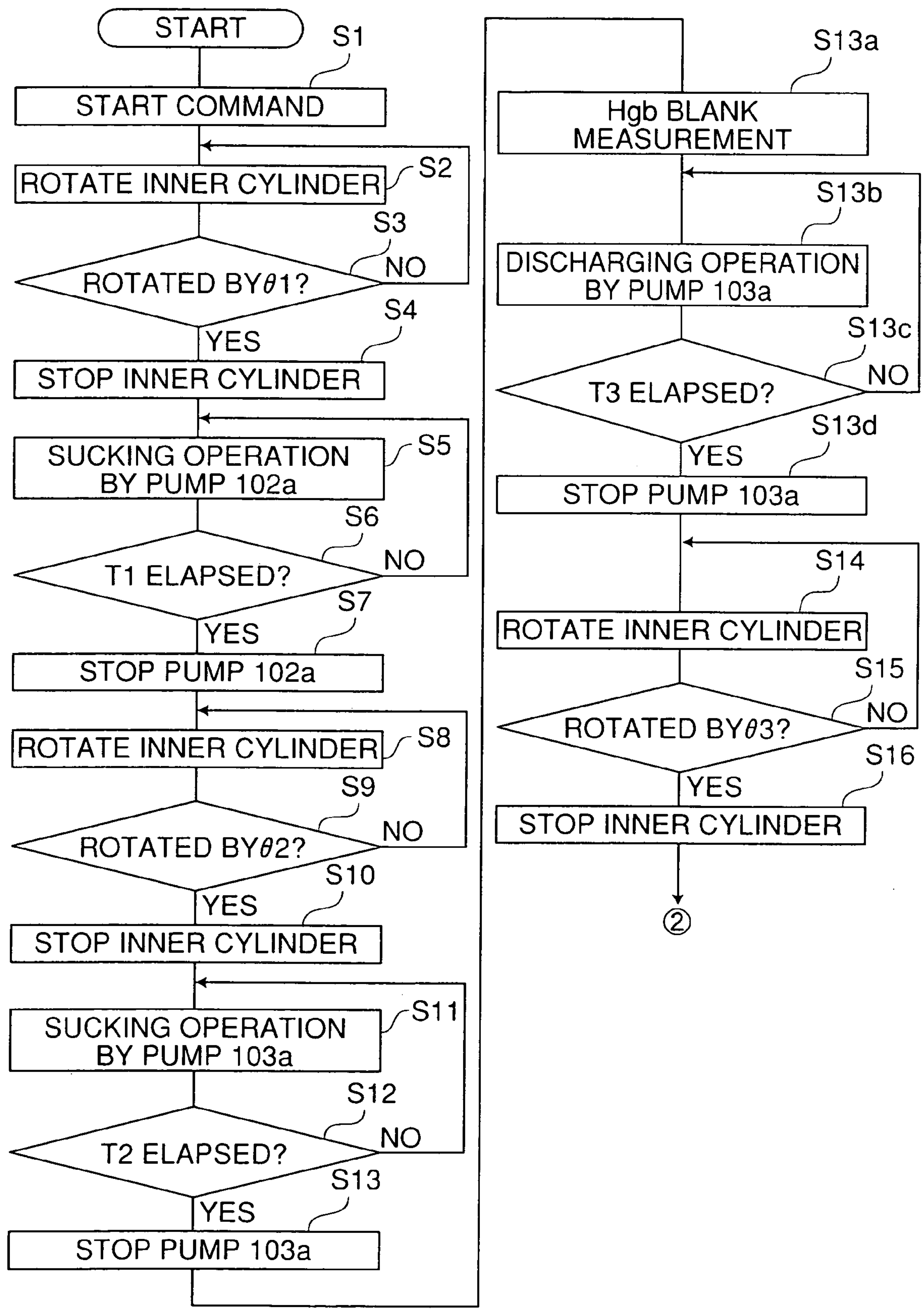
FIGS. 13 to 15 are flow charts for explaining the operation of the analyzer according to the embodiment shown in FIG. 12.
Figure 14:
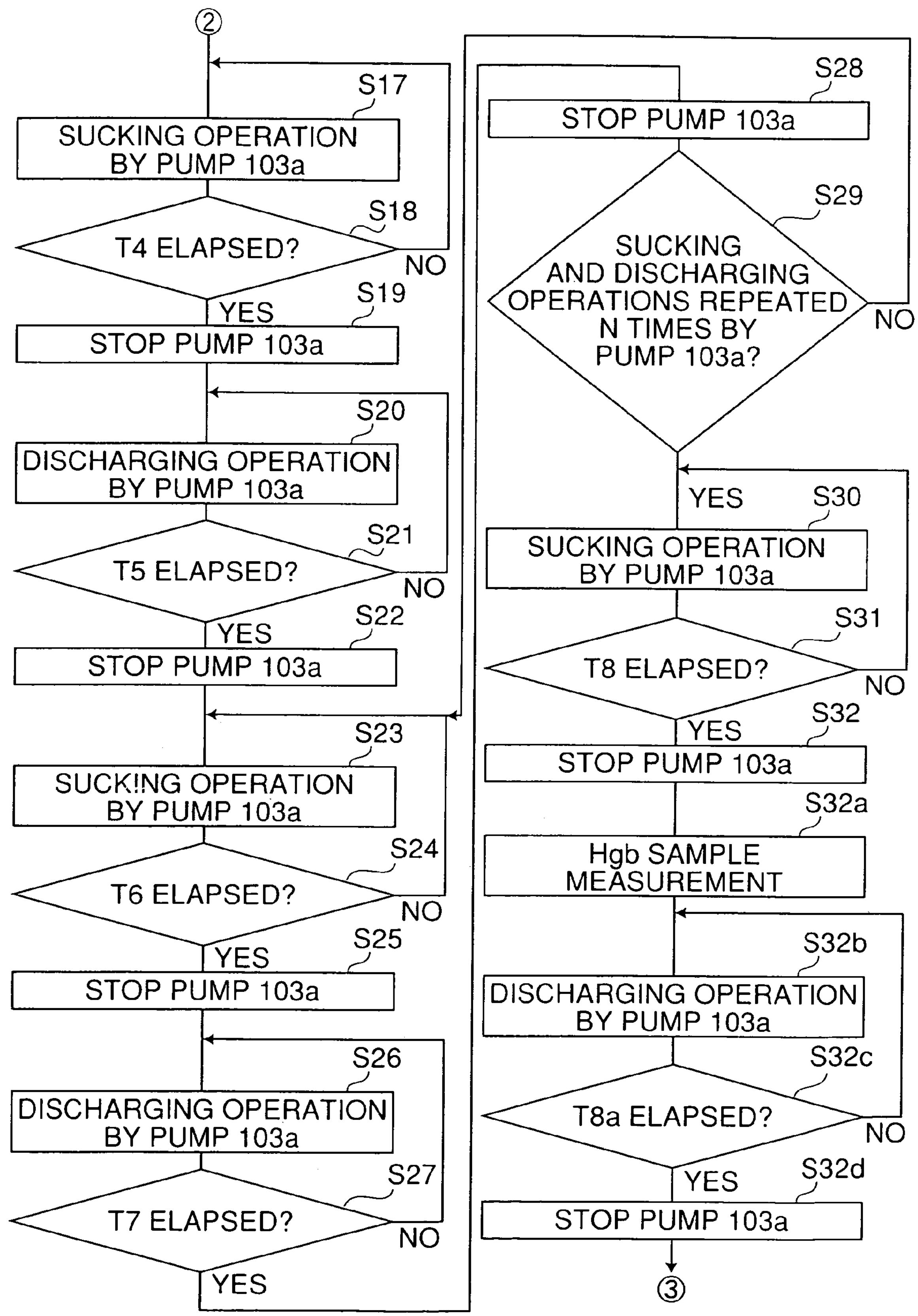
Figure 15:
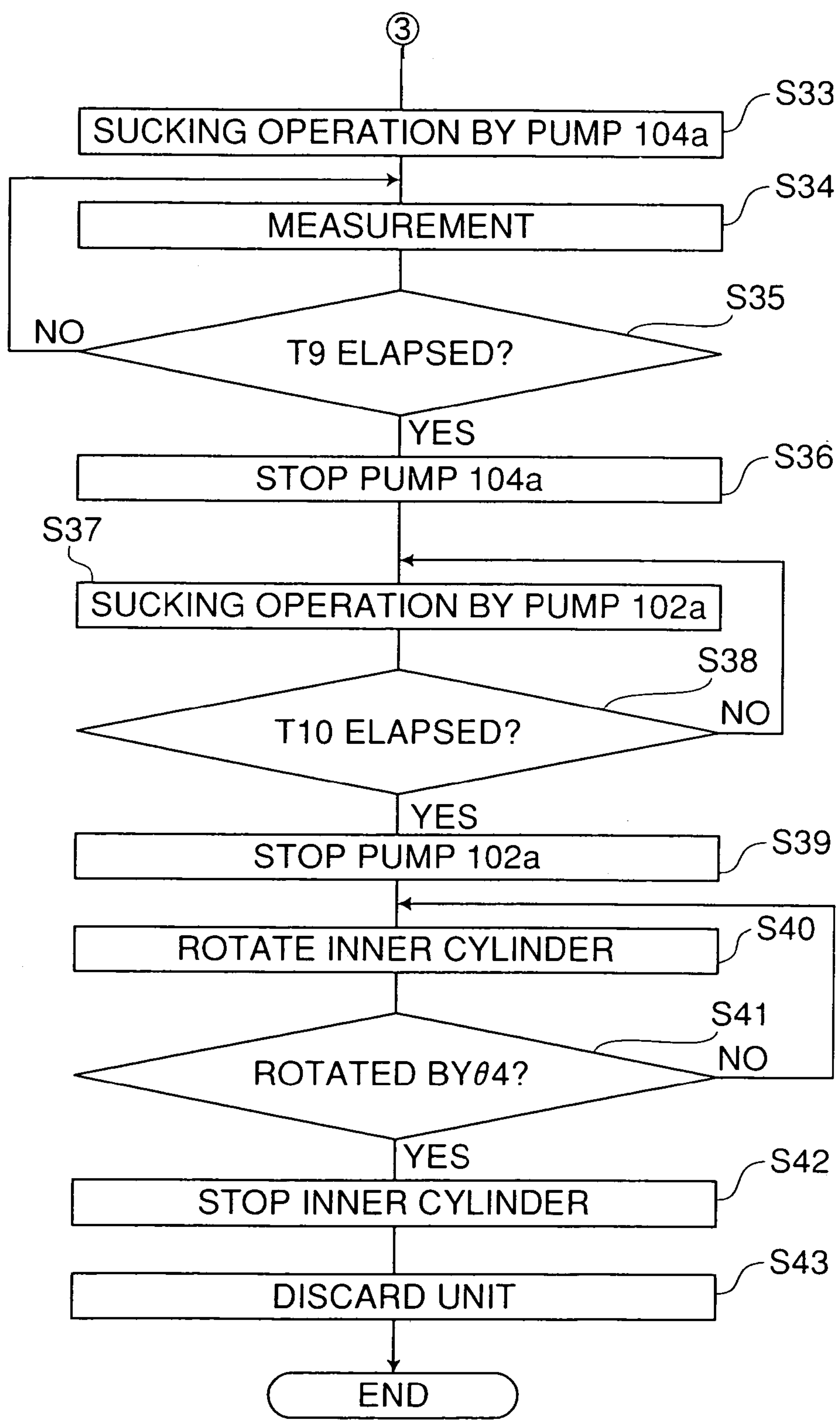
Figure 16A:
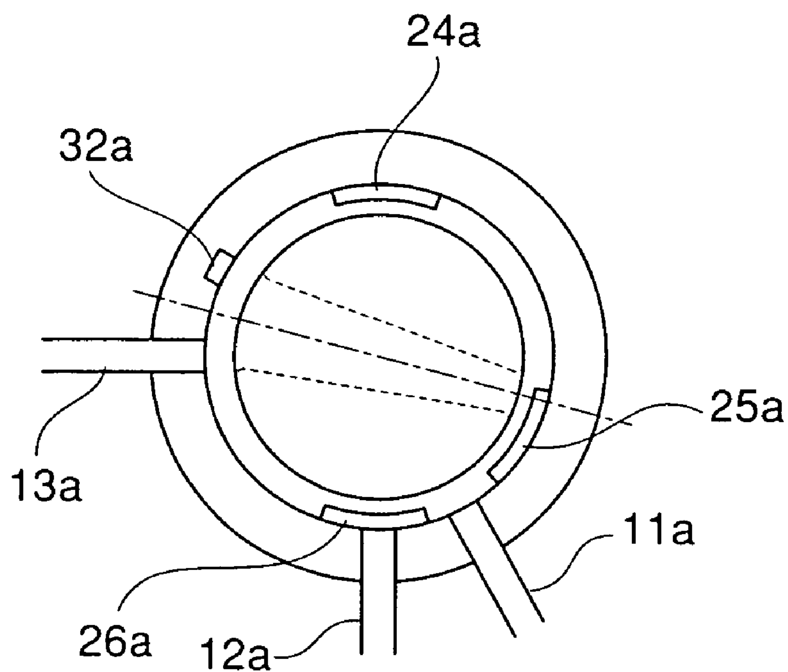
FIGS. 16(*a*) to 20(*b*) are diagrams for explaining the operation of the rotary valve of the measuring unit according to the embodiment.
Figure 16B:
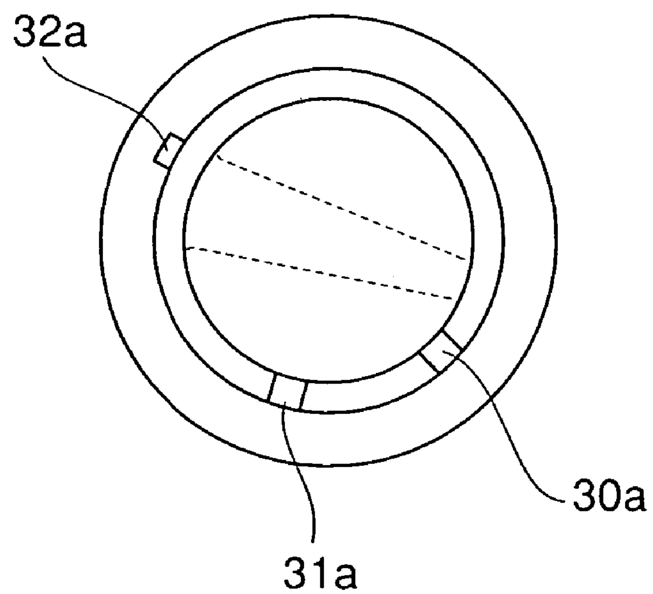

With reference to flow charts shown in FIGS. 13 to 15, an explanation will hereinafter be given to the operation of the analyzer 100*a* shown in FIG. 12. FIGS. 16(*a*), 16(*b*), 17(*a*), 17(*b*), 18(*a*), 18(*b*), 19(*a*), 19(*b*), 20(*a*) and 20(*b*) illustrate rotational positions of the inner cylinder 17*a* with respect to the outer cylinder 16*a* of the rotary valve 6*a*. Particularly, FIGS. 16(*a*) to 20(*a*) and FIGS. 16(*b*) to 20(*b*) are sectional views of the rotary valve 6*a* as seen in arrow directions A-A and B-B, respectively, in FIG. 5.

In the unit body 1*a*, the rotary valve 6*a* retains 1,000 μL of the diluent (a mixture of a dilution agent and a hemolyzing agent) preliminarily metered in the diluent container 5*a*. The inner cylinder 17*a* is initially in a rotational position as shown in FIGS. 16(*a*) and 16(*b*) with respect to the outer cylinder 16*a*, so that the diluent L is confined in the container 5*a* as shown in FIG. 21.

Figure 21:
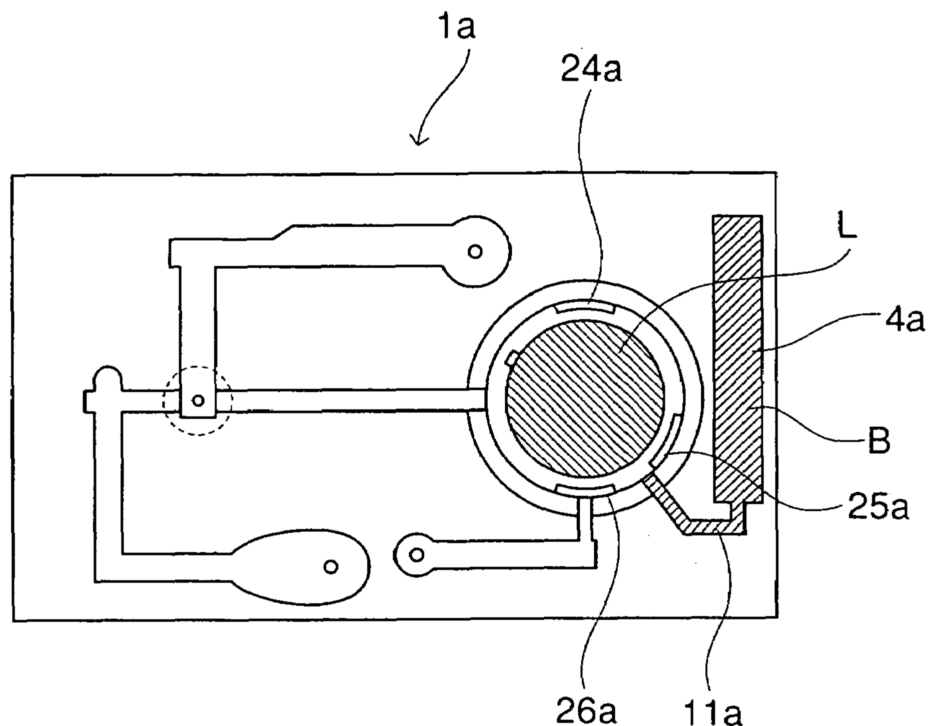
FIGS. 21 to 36 are diagrams for explaining the movement of a sample and a diluent in the measuring unit according to the embodiment.
Figure 22:
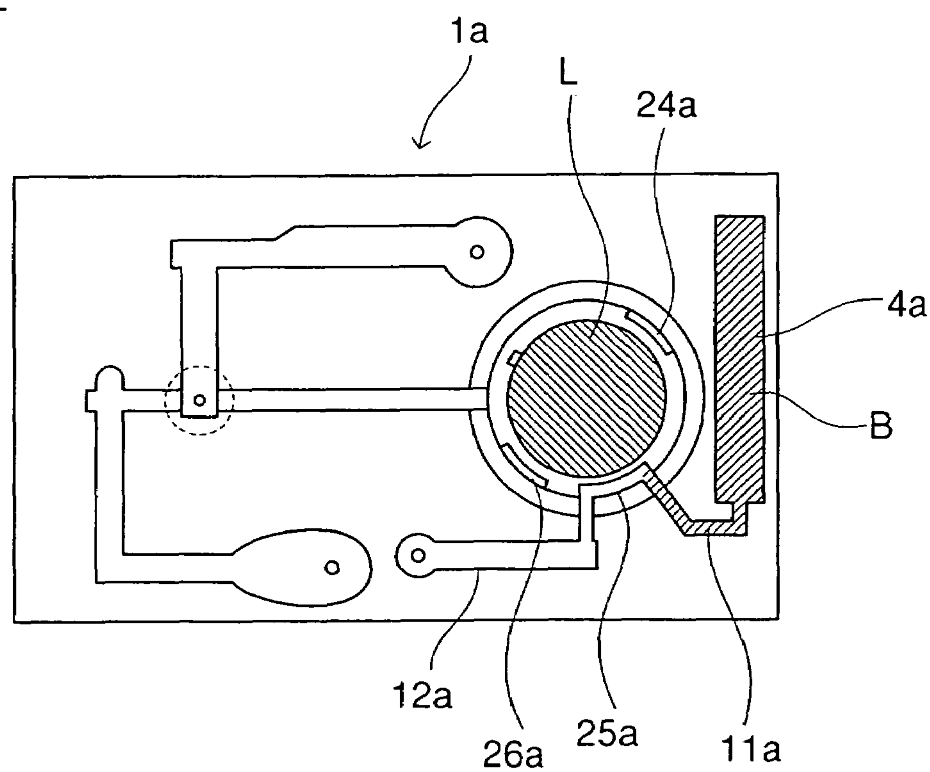

The unit body 1*a* is connected to the analyzer 100*a* as shown in FIG. 12, and about 10 μL to about 150 μL of a whole blood sample B is injected into the sample receiving section 4*a* by a syringe or a pipette as shown in FIG. 21. Alternatively, the capillary blood sampler in which the whole blood sample is retained may be inserted into an inlet of the channel 11*a*. Then, the sealing member on the top of the outer cylinder 16*a* of the rotary valve 6*a* is removed to open the through-hole 37*a*. The sealing member may be removed by a user of the analyzer 100*a* or, alternatively, the sealing member may be pierced by a piercing needle which may be provided in the analyzer 100*a*.

Figure 17A:
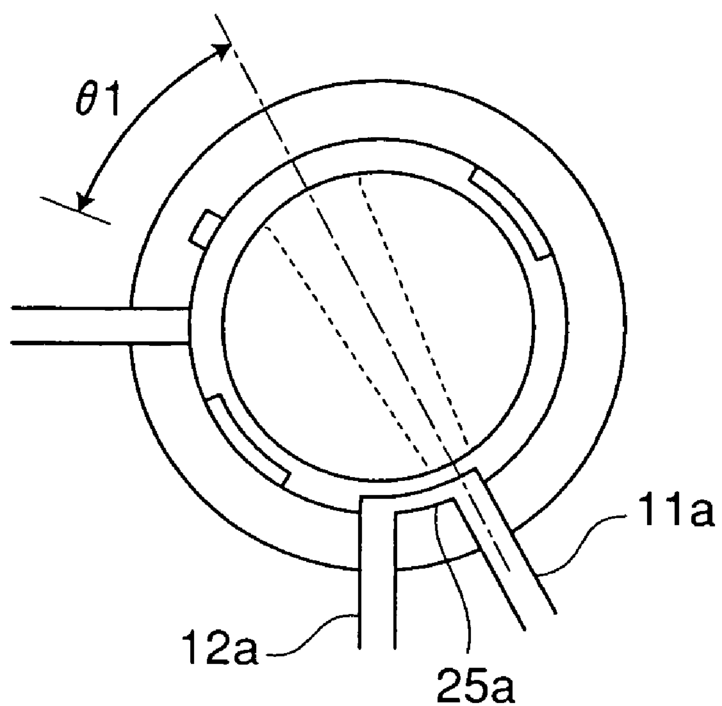
Figure 17B:
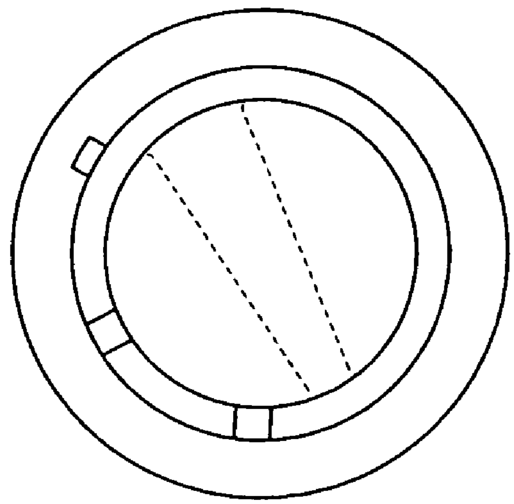

When a start command is applied from the input section 107*a* (FIG. 12) (Step S1), the stepping motor 105*a* is driven so that the inner cylinder 17*a* is rotated clockwise by an angle θ1 from the position shown in FIGS. 16(*a*) and 16(*b*) (Steps S2 to S4) thereby to reach a position as shown in FIGS. 17(*a*), 17(*b*) and 22.

Figure 23:
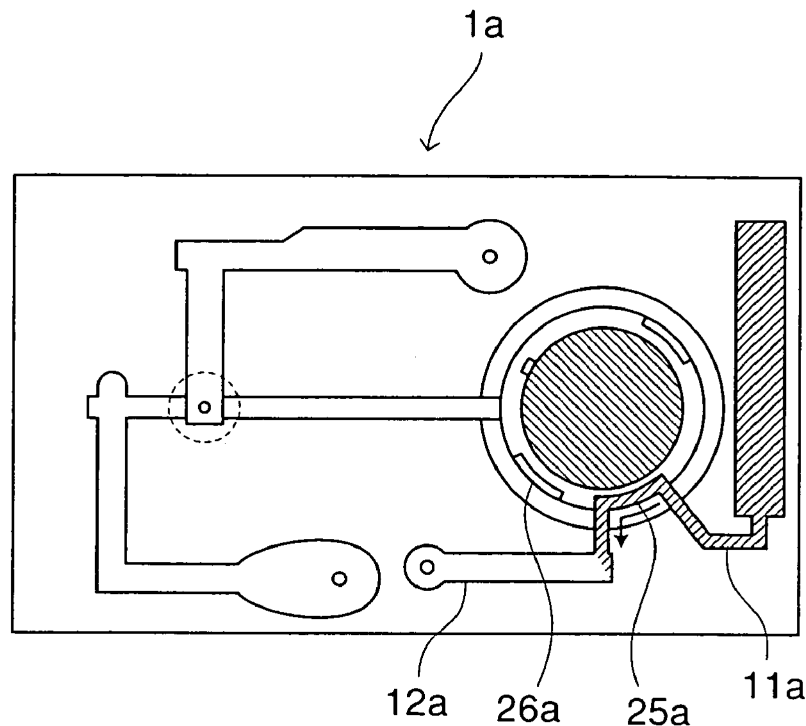

Thus, the channels 11*a*, 12*a* communicate with each other via the lateral groove 25*a* to form the metering channel as shown in FIGS. 17(*a*) and 22. In this state, the syringe pump 102*a* performs a sucking operation for a time period T1 (Step S5 to S7), whereby the sample B flows into the channel 12*a* from the sample receiving section 4*a* via the lateral groove 25*a* to fill the lateral groove 25*a* as shown in FIG. 23.

Figure 18A:
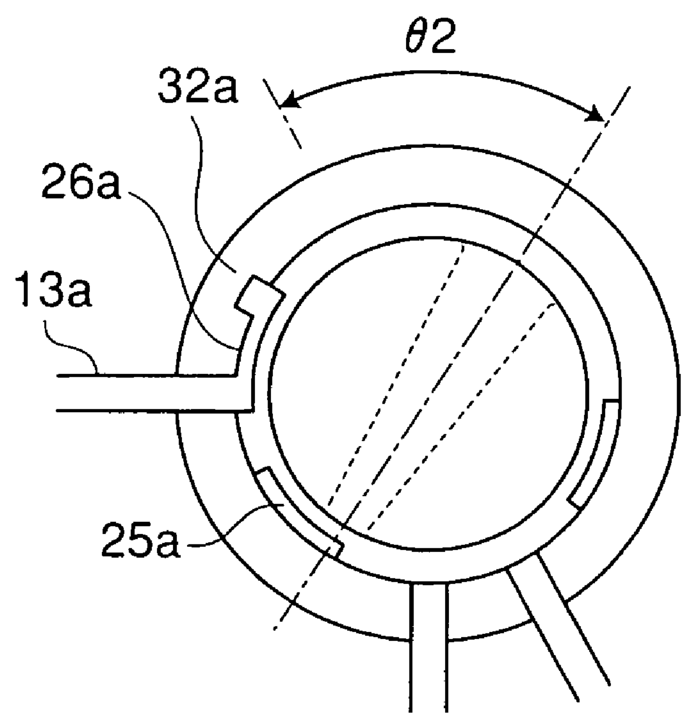
Figure 18B:
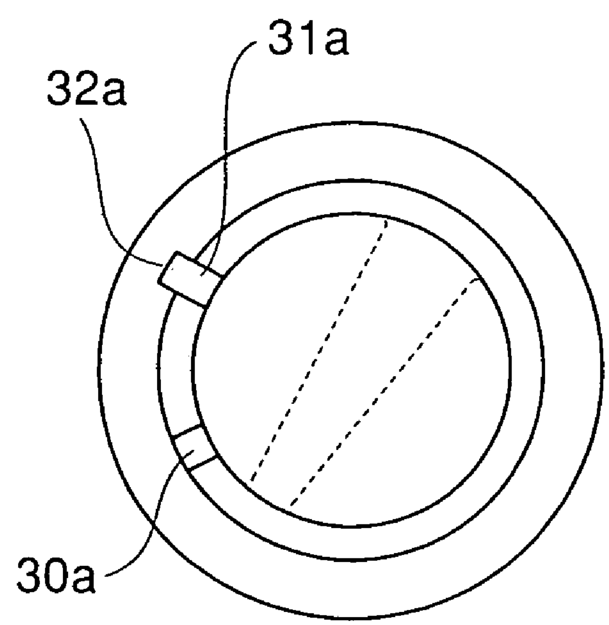
Figure 24:
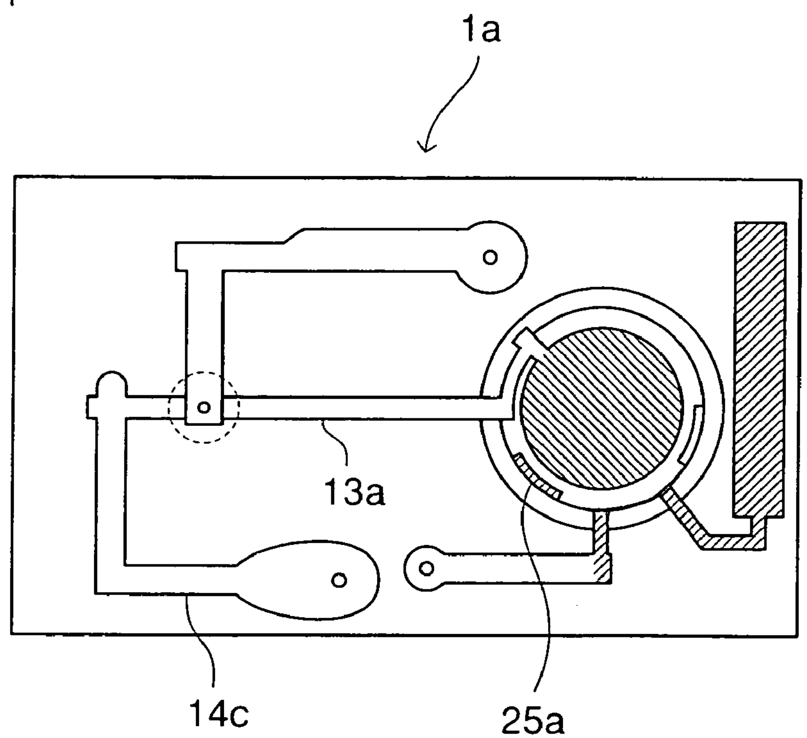

In turn, the stepping motor 105*a* is driven so that the inner cylinder 17*a* is rotated clockwise by an angle θ2 (Steps S8 to S10) thereby to reach a position as shown in FIGS. 18(*a*), 18(*b*) and 24. Thus, the sample is metered in a volume of 2 μm which is equivalent to the volume of the lateral groove 25*a*, and separated by the inner circumferential surface of the outer cylinder 16*a* as shown in FIG. 24.

At the same time, the channel 13*a* communicates with the bottom of the diluent container 5*a* via the lateral groove 26*a*, the vertical groove 32*a* and the through-hole 31*a* as shown in FIGS. 18(*a*) and 18(*b*).

Figure 25:
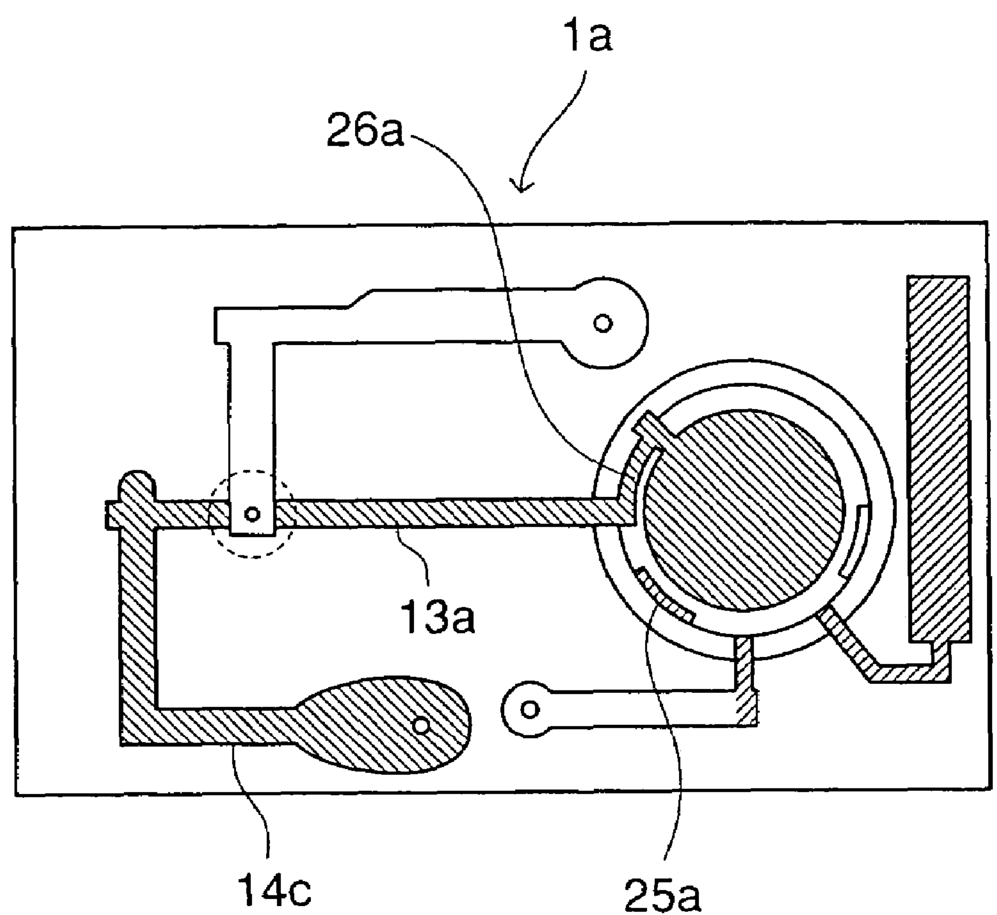
Figure 26:
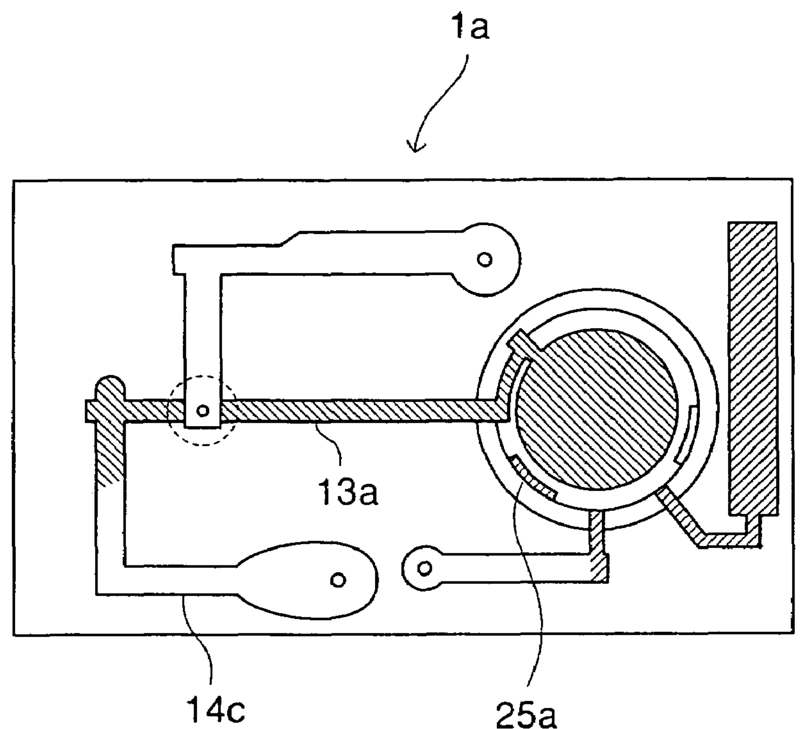
Figure 27:
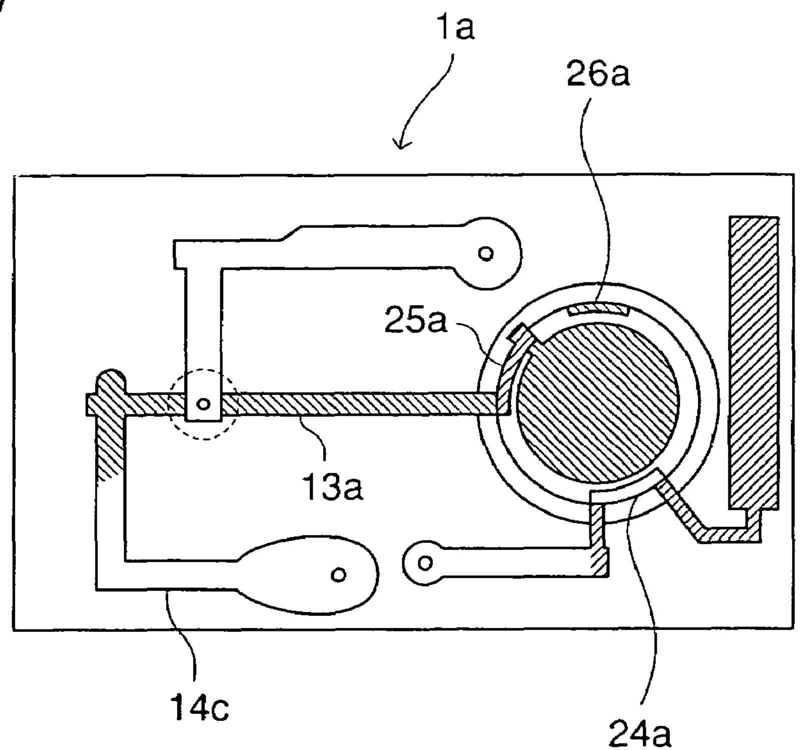

Then, the syringe pump 103*a* performs a sucking operation for a time period T2 (Steps S11 to S13), whereby the diluent L is introduced into the channels 13*a*, 14*c* from the diluent container 5*a* as shown in FIG. 25. In this state, the light emitting diode 125 is actuated, and the photodiode 126 measures the intensity of the light transmitted through the diluent (blank level) (Step S13*a*). When the syringe pump 103*a* performs a discharging operation for a time period T3 (Steps S13*b* to 13*d*), the diluent L is fed back into the diluent container 5*a* as shown in FIG. 26.

Figure 19A:
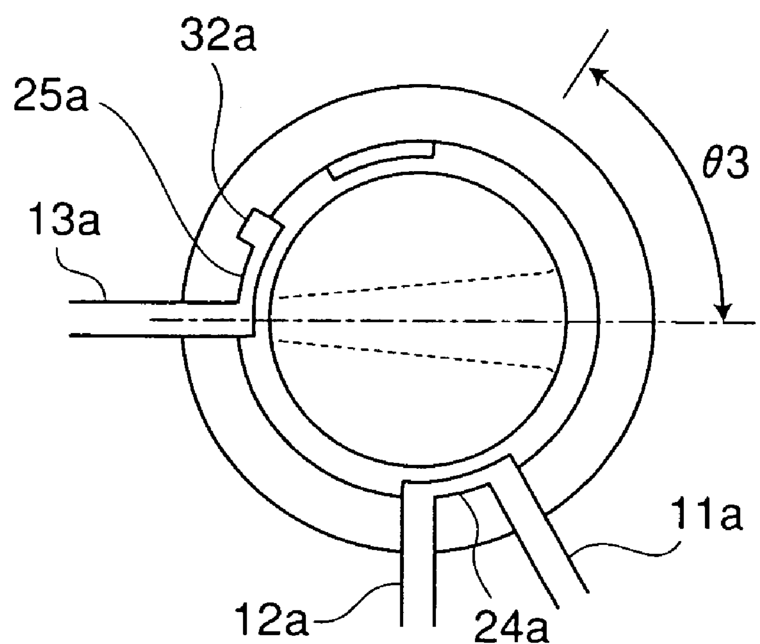
Figure 19B:
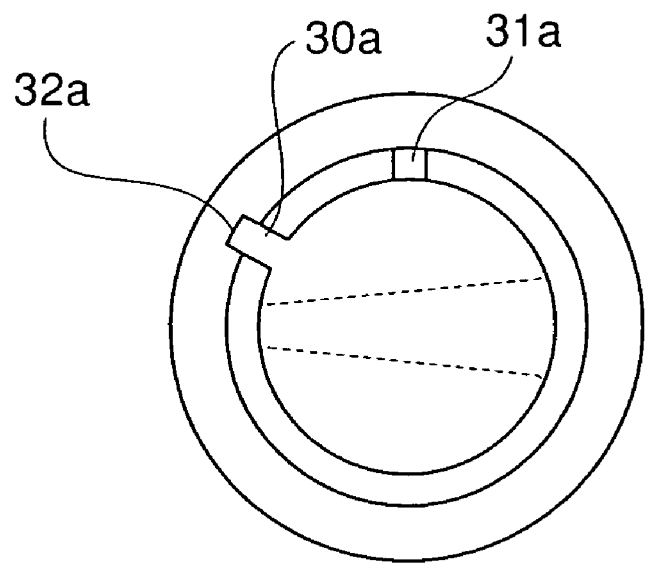

Subsequently, the stepping motor 105*a* is driven so that the inner cylinder 17*a* is rotated by an angle θ3 (Steps S14 to 16) thereby to reach a position as shown in FIGS. 19(*a*) and 19(*b*).

Thus, the channel 13*a* communicates with the bottom of the diluent container 5*a* via the lateral groove 25*a*, the vertical groove 32*a* and the through-hole 30*a* to form the agitation channel as shown in FIGS. 19(*a*), 19(*b*) and 27. At the same time, the channel 11*a* communicates with the channel 12*a* via the lateral groove 24*a* as shown in FIG. 19(*a*).

Figure 28:
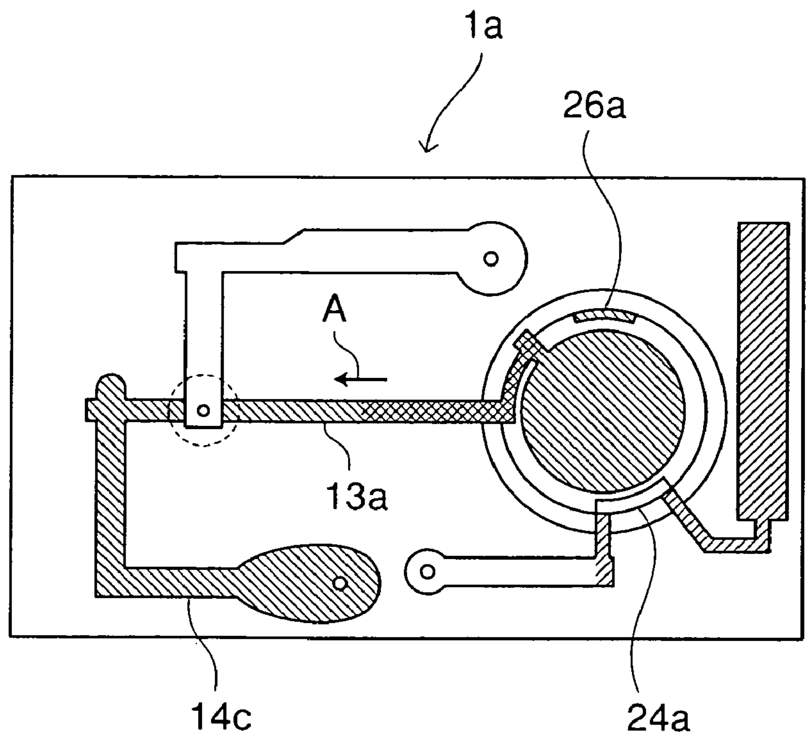

Then, the syringe pump 103*a* further performs the sucking operation for a time period T4 (Steps S17 to S19), whereby the diluent L in the diluent container 5*a* and the metered sample in the lateral groove 25*a* are introduced into the channel 13*a* as shown in FIG. 28.

Figure 29:
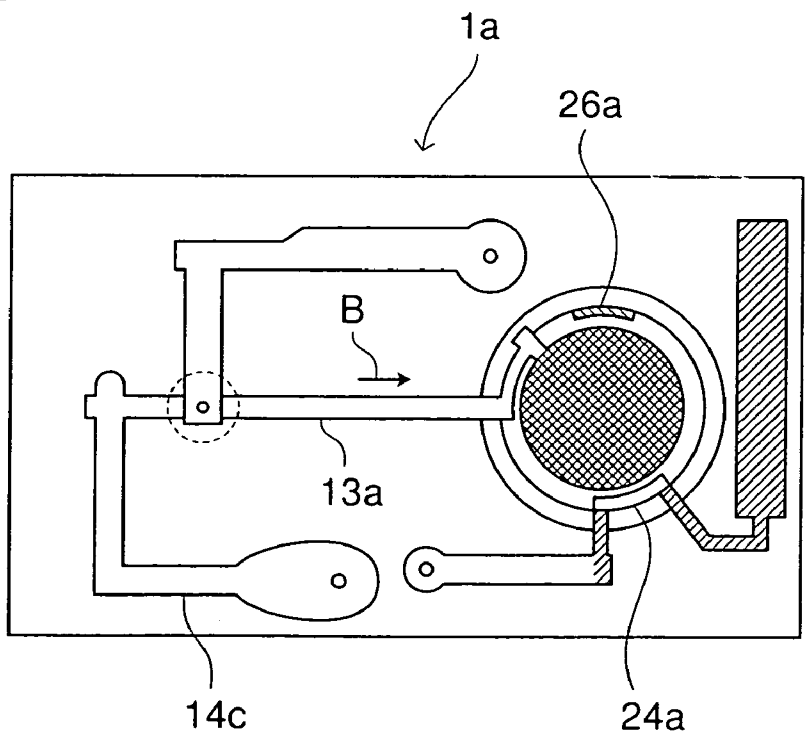

In turn, the syringe pump 103*a* performs a discharging operation for a time period T5 (Steps S20 to S22), whereby the sample and the diluent are fed back into the diluent container 5*a* as shown in FIG. 29.

Figure 30:
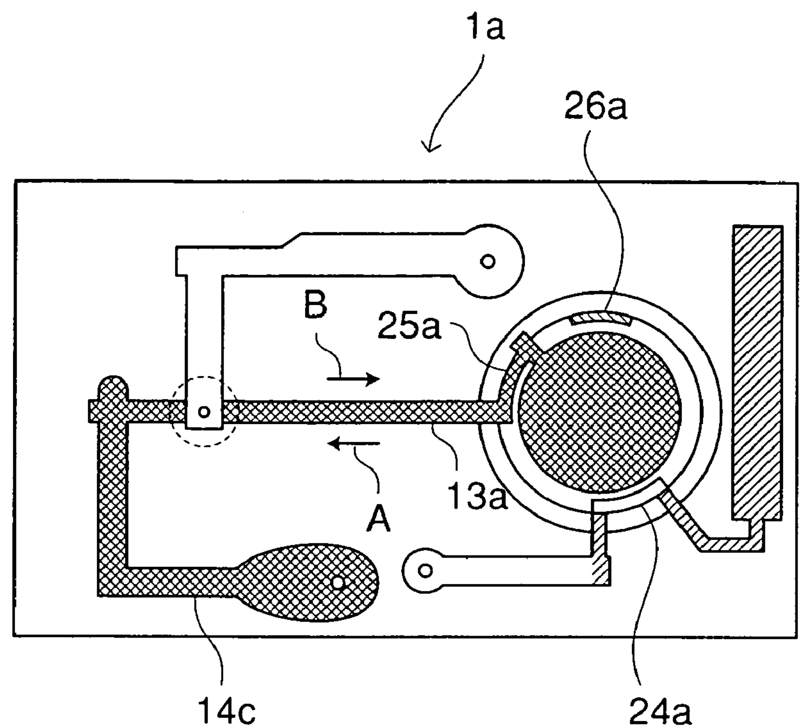
Figure 31:
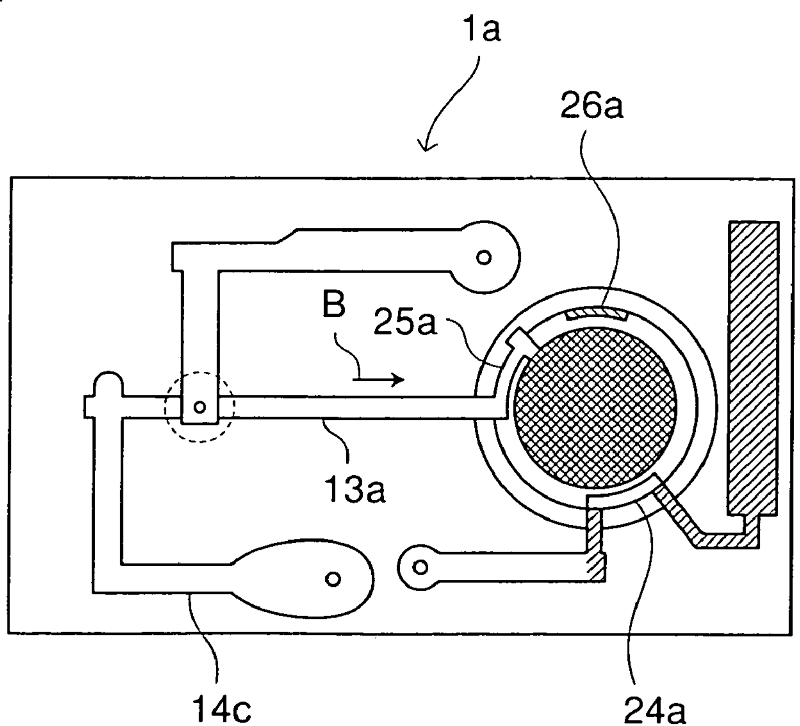

Subsequently, the syringe pump 103*a* repeats a T6-period sucking operation and a T7-period discharging operation N times, whereby the diluent and the sample flow back and forth between the channels 13*a*, 14*c* and the diluent container 5*a* in arrow directions A, B as shown in FIG. 30 (Steps S23 to S29). Thus, the diluent and the sample are sufficiently mixed and agitated for preparation of a 500-time diluted sample. The diluted sample is retained in the diluent container 5*a* as shown in FIG. 31.

Figure 32:
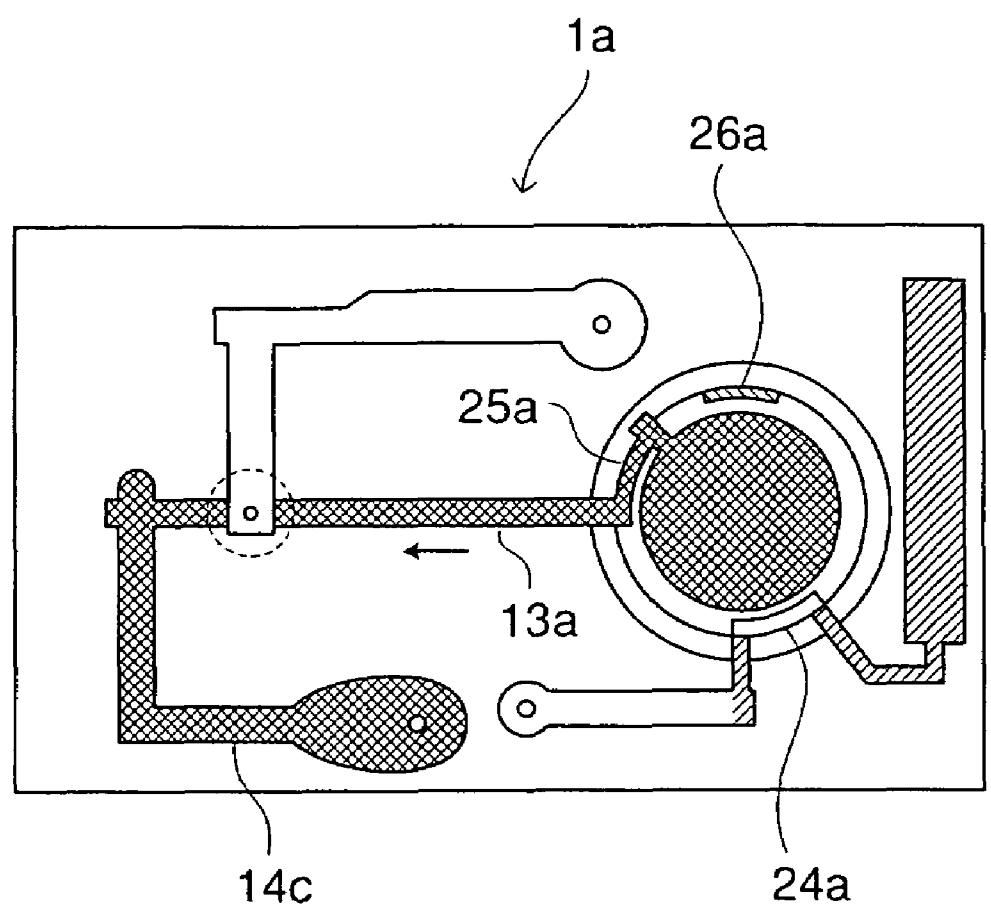

Then, the syringe pump 103*a* performs the sucking operation for a time period T8 (Steps S30 to S32), whereby the diluted sample is introduced into the channels 13*a*, 14*c* from the diluent container 5*a* as shown in FIG. 32. In this state, the photodiode 126 receives light emitted from the light emitting diode 125, whereby the intensity of the light transmitted through the diluted sample is measured (Step S32*a*).

Figure 33:
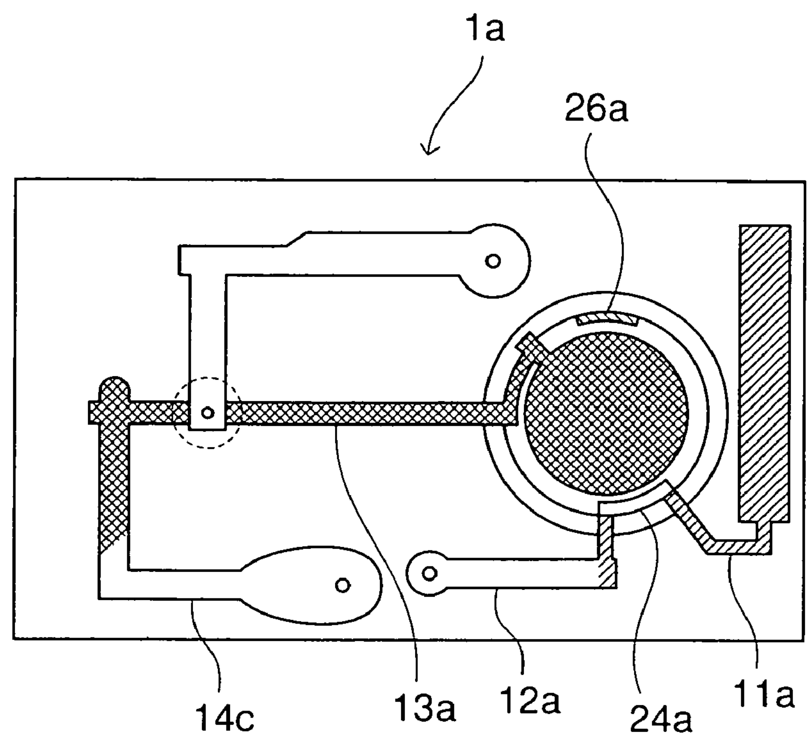

Subsequently, the syringe pump 103*a* performs the discharging operation for a time period T8*a* (Steps S32*b* to S32*d*), whereby the diluted sample is fed back into the diluent container 5*a* as shown in FIG. 33.

Figure 34:
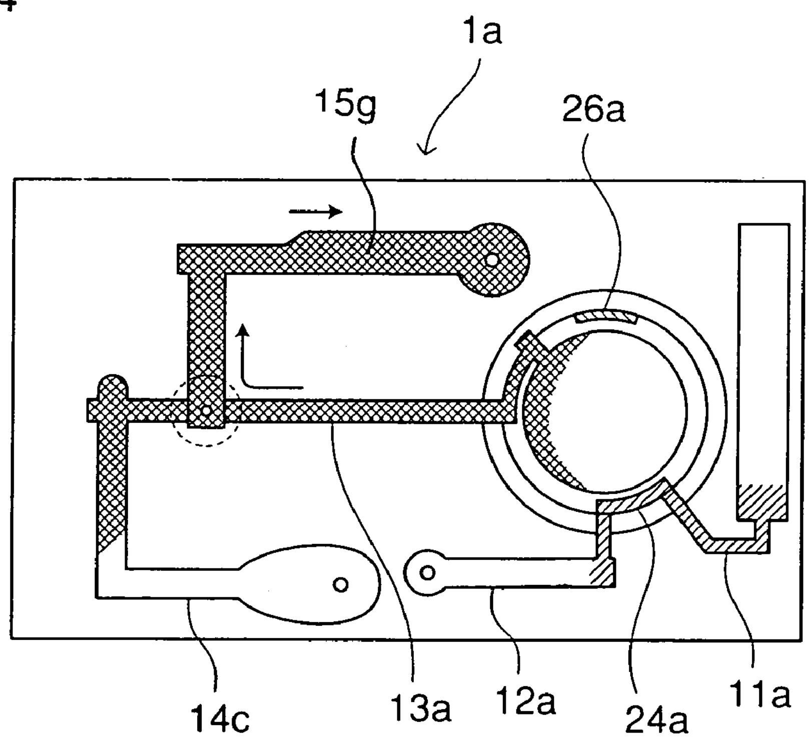

In turn, the syringe pump 104*a* performs a sucking operation for a time period T9, whereby the diluted sample flows toward the syringe pump 104*a* from the diluent container 5*a* via the pellet 33*b* and the channel 15*g* (i.e., via the measuring channel) as shown in FIG. 34. During this period, the signal processing section 106*e* measures an electrical resistance between the electrodes 34*a* and 35*a* (Steps S33 to S36).

Figure 35:
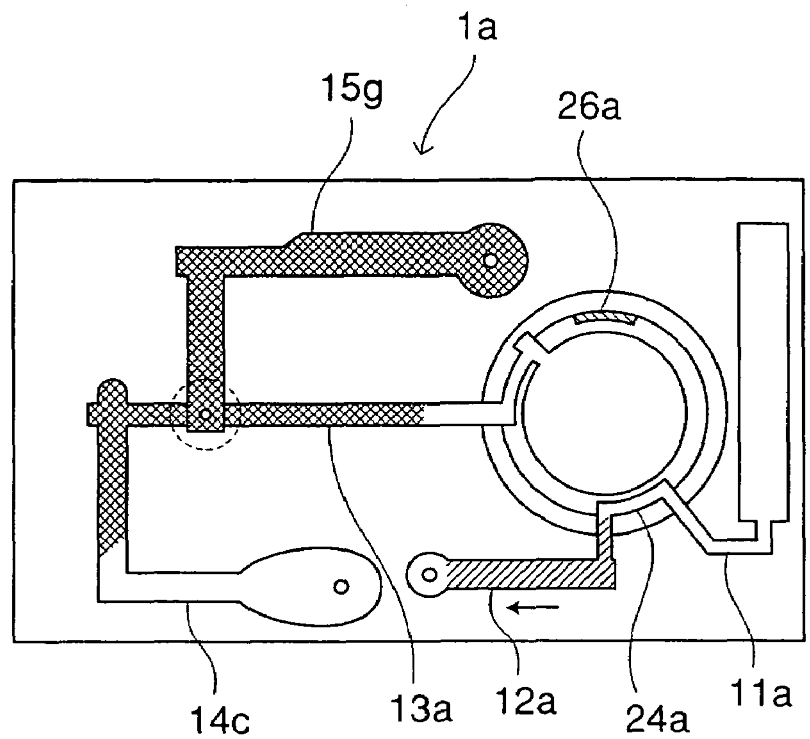

Then, the syringe pump 102*a* performs the sucking operation for a time period T10 (Steps S37 to S39), whereby all the sample remaining in the sample receiving section 4*a* is retained in the channel 12*a* as shown in FIG. 35. On the other hand, all the diluted sample in the diluent container 5*a* is retained in the channels 13*a*, 14*c*, 15*g* in Steps S33 to S36.

Figure 20A:
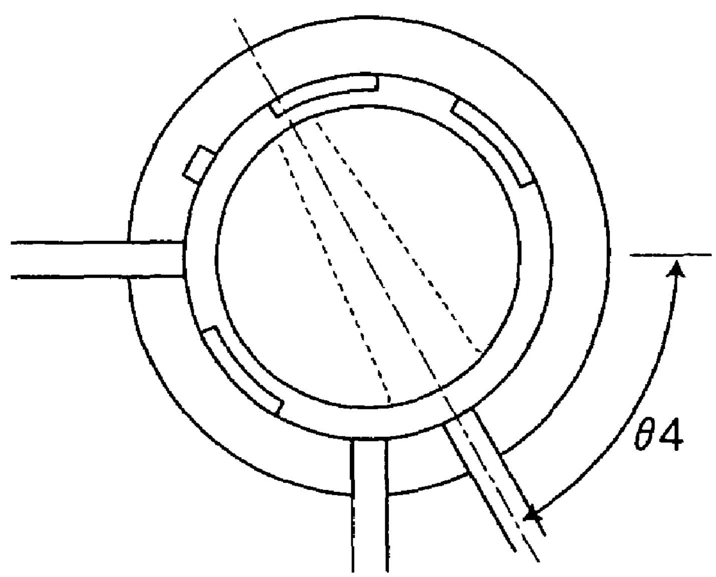
Figure 20B:
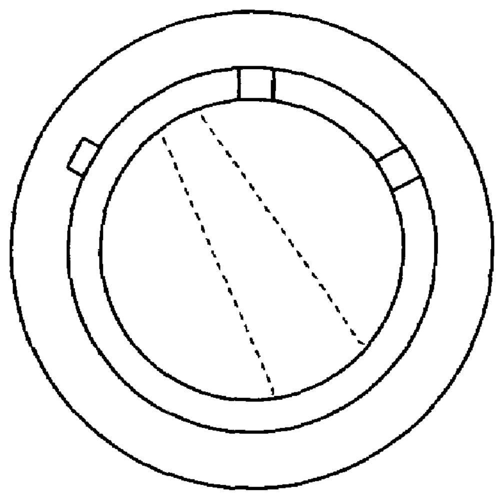
Figure 36:
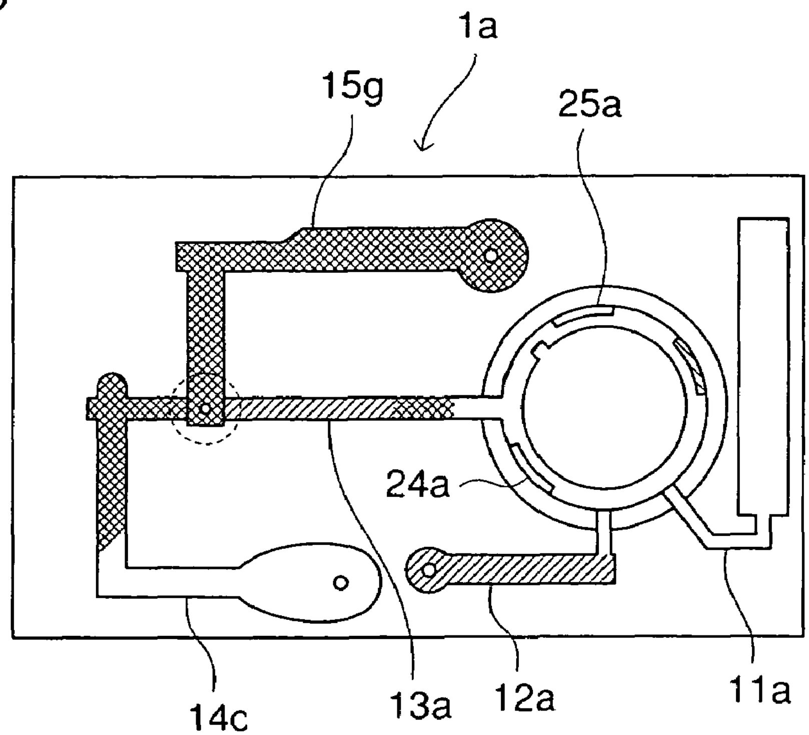

In turn, the stepping motor 105*a* is driven so that the inner cylinder 17*a* is rotated clockwise by an angle θ4 (Steps S40 to S42) thereby to reach a position as shown in FIGS. 20(*a*) and 20(*b*). Thus, the channel 11*a* is brought out of communication with the channel 12*a* as shown in FIG. 36.

In the aforesaid manner, the measuring operation is completed with the residual sample retained in the channel 12*a* and with the diluted sample retained in the channels 13*a*, 14*c* and 15*g*. After the through-hole 37*a* in the top wall of the rotary valve 6*a* is sealed again, the unit body 1*a* is removed from the analyzer 100*a* and discarded (Step S43). Since the unit body 1*a* is discarded after use, a user can perform a sample analyzing operation safely and sanitarily.

7. Analysis of White Blood Cells and Hemoglobin

When the constant current from the constant direct current source 101*a* (FIG. 12) is applied to the diluted sample between the electrodes 34*a* and 35*a* in a space separated by the pellet 33*b* having the minute through-hole 33*c* as shown in FIG. 10, the electrical resistance between the electrodes 34*a* and 35*a* generally depends on the specific resistivity of a liquid component of the diluted sample. Particularly, the electrical resistance is determined by an electrical resistance of the liquid component present in and around the minute through-hole 33*c*, mainly depending on the diameter and length of the minute through-hole 33*c*.

When a white blood cell passes through the minute through-hole 33*c*, the liquid component is removed by the volume of the white blood cell, so that the electrical resistance between the electrodes 34*a* and 35*a* changes. A change in the electrical resistance is detected as a voltage pulse generated between the electrodes 34*a* and 35*a*.

Therefore, the computing section 106*d* determines the number of white blood cells on the basis of the number of pulses. Since the amplitude of the pulse is proportional to the volume of the white blood cell, the computing section 106*d* detects the amplitude of each pulse, and calculates the spherical equivalent diameter of each white blood cell for preparation of a particle size distribution diagram.

Further, the computing section 106*d* determines the absorbance of the diluted sample by a known method on the basis of the transmitted light intensity of the diluent (blank level) and the transmitted light intensity of the diluted sample obtained by the optical characteristic measuring section 7*b*

(FIG. 1). The amount of the hemoglobin is calculated on the basis of the absorbance thus determined.

Figure 39:
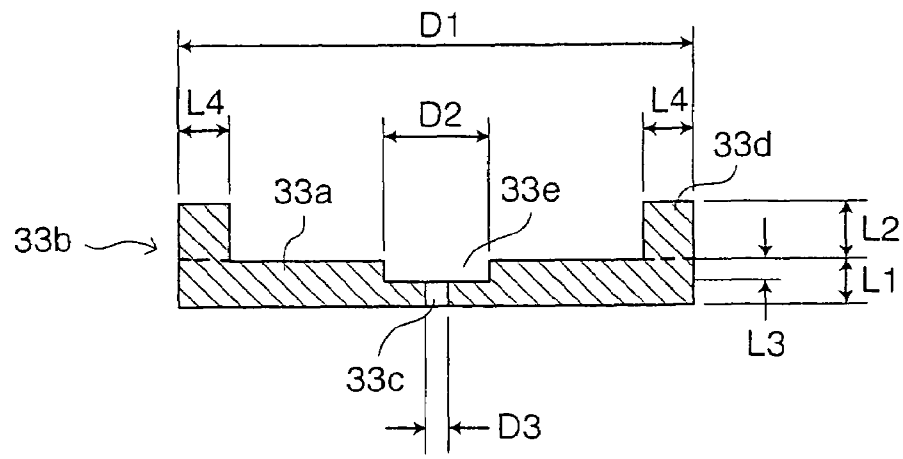
FIG. 39 is a sectional view illustrating a pellet according to the embodiment.

8. Construction of Pellet (Partition Member) **33*b* of Electrical Resistance Measuring Section FIG. 39 is an enlarged view of the pellet 33*b* shown in FIG. 10**.

As shown, the pellet **33*b* is a unitary member which includes a disk-shaped pellet base 33*a* having an outer diameter D1 and a thickness L1, and a ring-shaped projecting portion 33*d* projecting from an upper peripheral edge thereof and having a height L2 and a thickness L4. That is, the pellet 33*b* includes a pellet base 33*a* having the minute through-hole 33*c*, and a ring-shaped projecting portion 33*d* projecting axially of the minute through-hole 33*c* from the pellet base 33*a* as surrounding the minute through-hole 33*c*. The pellet base 33*a* has a round recess 33*e* formed in a center portion thereof and having a diameter D2 and a depth L3, and the through-hole 33*c* extending through the center thereof and having a diameter D3. The through-hole 33*c* has a length (L1-L3) which is 1.2 to 1.3 times the diameter D3**.

In this embodiment, L1=0.3 mm, L2=1.4 mm, L3=0.17 mm, L4=1 mm, D1=6 mm, D2=1.1 mm, and D3=0.1 mm. A resin, which may be either a thermoplastic resin or a thermosetting resin, is used as a material for the pellet **33*b***.

The pellet **33*b* having the aforesaid construction has a greater thickness along its outer periphery by a thickness L2 of 1.4 mm due to the presence of the projecting portion 33*d*. As shown in FIG. 10, the round projection of the upper plate 2*a* is fitted in the round recess 33*e* and a space surrounded by the projecting portion 33*d* of the pellet 33*b*, and the pellet 33*b* is assuredly press-fitted in the round recess of the lower plate 3*a*. That is, the projecting portion 33*d* is sandwiched between the round projection of the upper plate 2*a* and the round recess of the lower plate 3*a*. Therefore, no adhesive is required. Further, the projecting portion 33*d* serves to enhance the flexural rigidity of the pellet base 33*a*, thereby preventing deformation of the pellet 33*b* which may otherwise occur in the press-fitting of the pellet 33*b***.

Further, surface areas of the upper plate **2*a* and the lower plate 3*a* in contact with the pellet 33*b* are virtually increased due to the presence of the pellet base 33*a* and the projecting portion 33*d*, so that liquid tightness between the pellet 33*b* and the upper and lower plates 2*a*, 3*a* is improved. Therefore, all the liquid flowing from the vertical portion 15*e* to the vertical portion 15*d* through the pellet 33*b* passes through the through-hole 33*c* without bypassing the through-hole around the outer periphery of the pellet 33*b* (without leakage). The presence of the round recess 33*e* allows the pellet 33*b* to have a greater thickness L1, so that the pellet 33*b*** has an increased strength.

FIGS. 40 to 47 illustrate variations of the pellet **33*b* shown in FIG. 39**.

Figure 40:
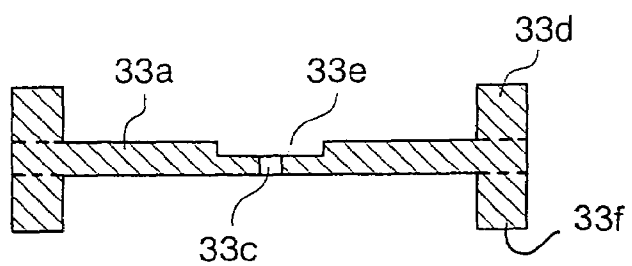
FIGS. 40 to 47 are sectional views illustrating variations of the pellet of FIG. 39.

A pellet shown in FIG. 40 has substantially the same construction as the pellet **33*b* shown in FIG. 39, but has a ring-shaped projecting portion 33*f* projecting from a lower peripheral edge of the pellet base 33*a*. The projecting portion 33*f* serves as a damage prevention portion for preventing a lower surface of the pellet base 33*a*** from being damaged.

Figure 41:
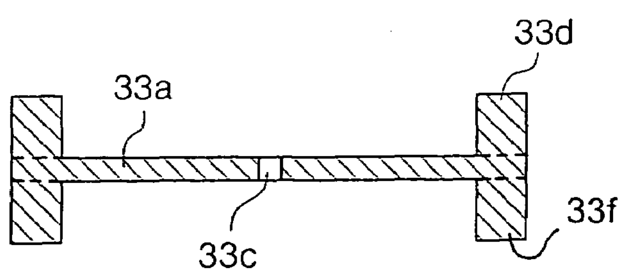

A pellet shown in FIG. 41 has substantially the same construction as the pellet shown in FIG. 40, but has a thinner pellet base **33*a* without the recess 33*e***.

Figure 42:
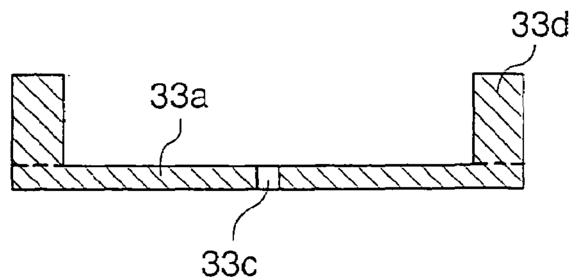

A pellet shown in FIG. 42 has substantially the same construction as the pellet shown in FIG. 39, but has a thinner pellet base **33*a* without the recess 33*e***.

Figure 43:
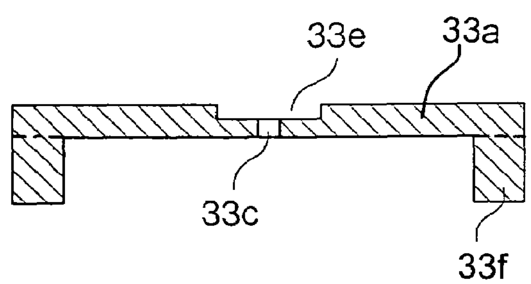

A pellet shown in FIG. 43 has substantially the same construction as the pellet shown in FIG. 40, but the projecting portion **33*d* is provided on a surface opposite to that of the pellet base 33*a* having the recess 33*e***.

Figure 44:
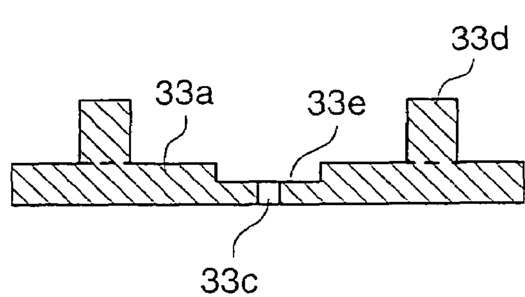

A pellet shown in FIG. 44 has substantially the same construction as the pellet shown in FIG. 39, except that the projecting portion **33*d*** has smaller outer and inner diameters.

Figure 45:
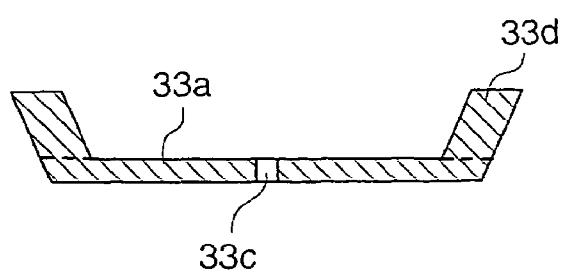

A pellet shown in FIG. 45 has substantially the same construction as the pellet shown in FIG. 42, except that the projecting portion **33*d* has outer and inner diameters progressively increasing toward its distal edge away from the pellet base 33*a***.

Figure 46:
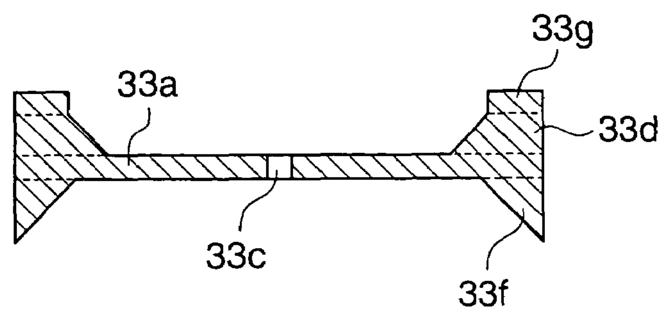

A pellet shown in FIG. 46 has substantially the same construction as the pellet shown in FIG. 41, except that the projecting portions **33*d* and 33*f* each have a tapered interior wall with the inner diameter thereof progressively decreasing toward the proximal edge thereof away from the distal edge thereof. The projecting portion 33*f* serves as the damage prevention portion for preventing the lower surface of the pellet base 33*a*** from being damaged.

Figure 47:
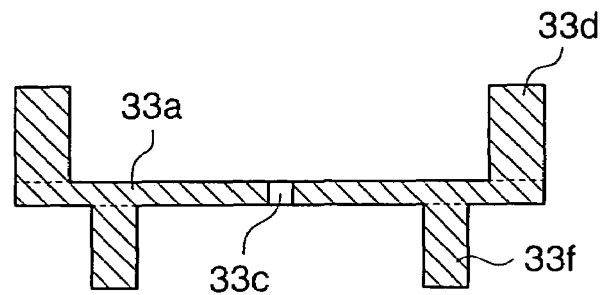

A pellet shown in FIG. 47 has substantially the same construction as the pellet shown in FIG. 42, except that the projecting portion **33*f* serving as the damage prevention portion is provided on a surface opposite to that of the pellet base 33*a* having the projecting portion 33*d*, and the projecting portion 33*f* is smaller than the projecting portion 33*d*** in diameter.

The aforesaid pellets have such a simple construction that the projecting portions are projected from the base, so that it is easy to produce them using a mold as described later.

The pellets shown in FIGS. 40 to 47 provide the same functions and effects as the pellet **33*b* shown in FIG. 39**.

The aforesaid various pellets may be provided in the measuring unit or in a detector to be preliminarily incorporated in a sample analyzer.

9. Apparatus and Method for Producing Pellet (Partition Member) **33*b***

Figure 48:
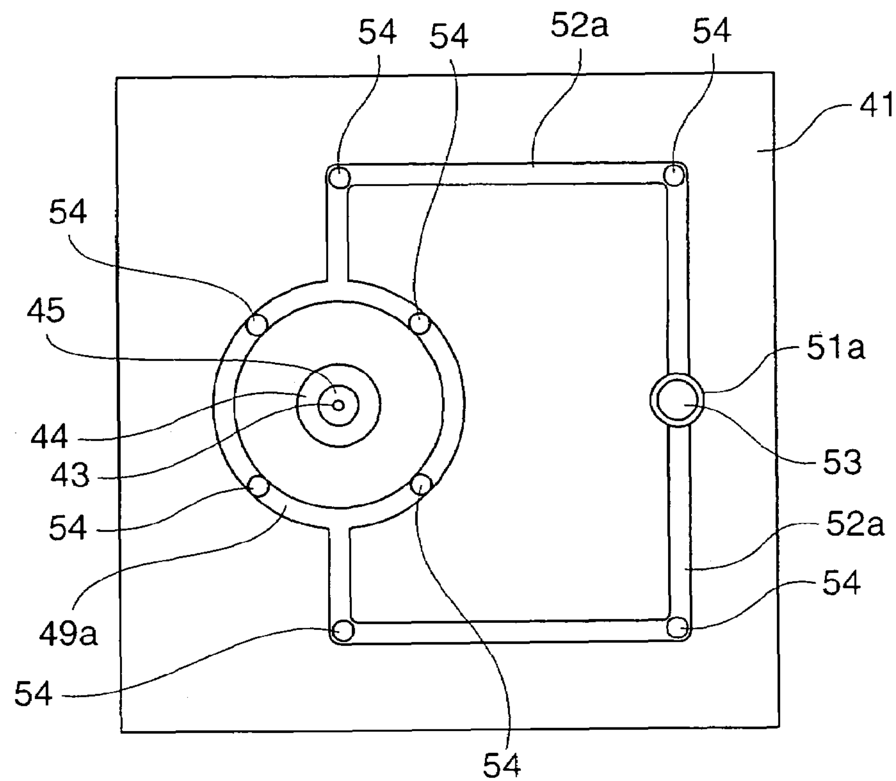
FIG. 48 is a plan view of a male die of a mold according to the embodiment.
Figure 49:
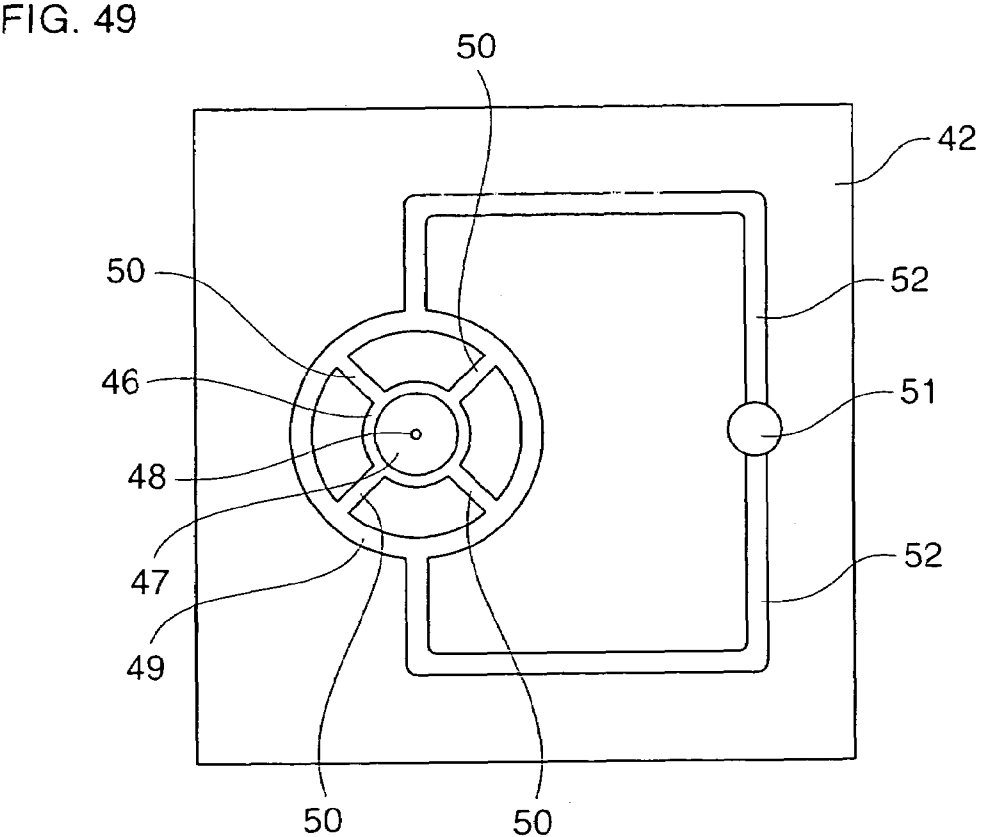
FIG. 49 is a plan view of a female die of the mold according to the embodiment.
Figure 50:
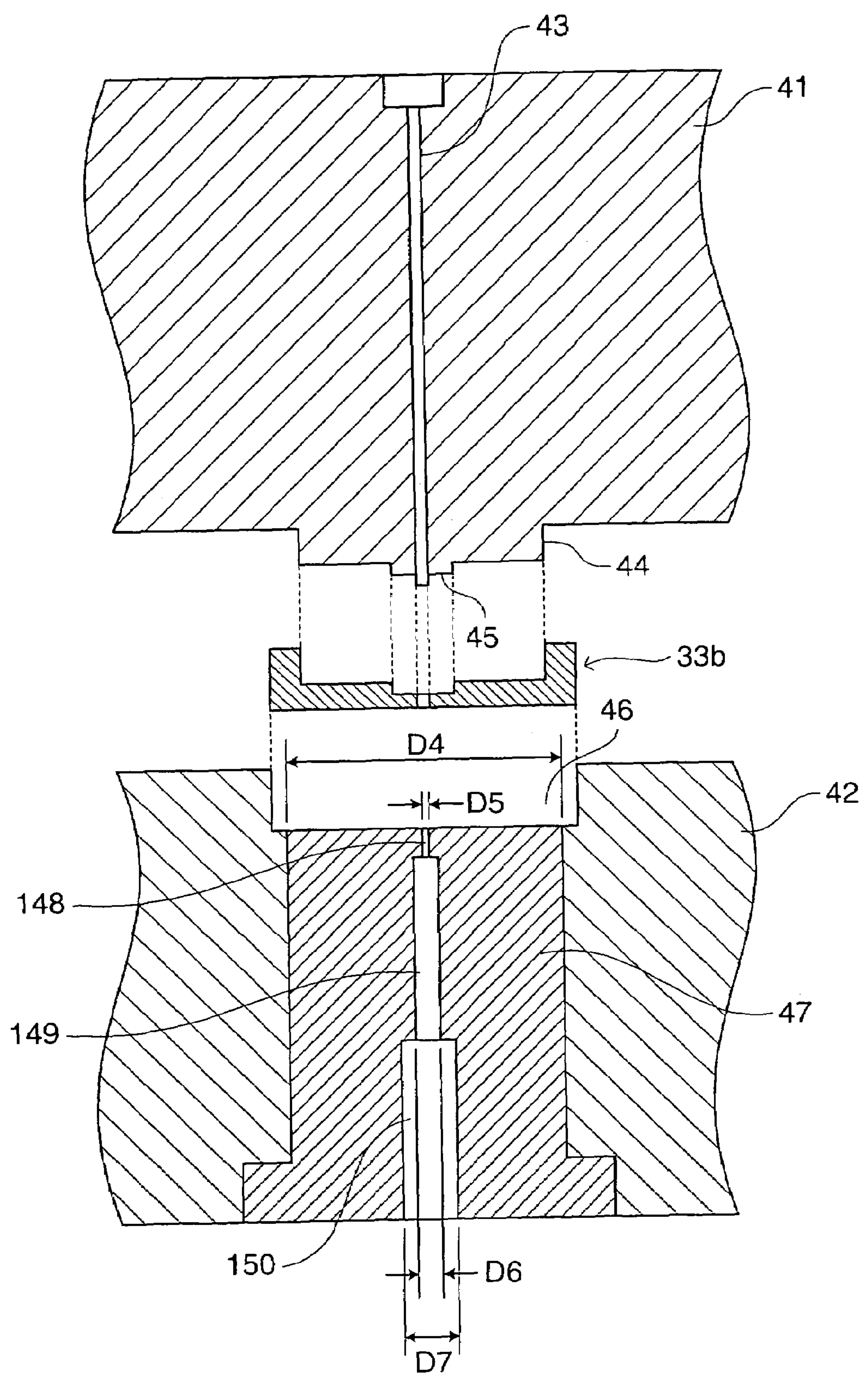
FIG. 50 is a sectional view for explaining a positional relationship between the male die and the female die of the mold according to the embodiment.

FIGS. 48 and 49 are plan views respectively illustrating mating surfaces (contact surfaces) of male and female dies of a mold for use in injection molding of the pellet **33*b*. FIG. 50 is a sectional view for explaining a positional relationship between the male and female dies and the pellet 33*b*** to be molded.

As shown in FIG. 50, a core pin 43 having a diameter of 0.1 mm extends vertically through the male die 41, and projects from the mating surface of the male die 41. A round projection 44 having a diameter of 4 mm (=D1−2L4) and a height of 1.4 mm (=L2) is provided coaxially with a projection end of the core pin 43 on the mating surface of the male die 41. A round projection 45 having a diameter of 1.1 mm (=D2) and a height of 0.17 mm (=L3) is provided coaxially with the projection end of the core pin 43 on the surface of the projection 44. The projection end of the core pin 43 has a length of 0.13 mm (=L1−L3) as measured from the surface of the projection 45.

On the other hand, a recess (cavity) 46 having a diameter of 6 mm (=D1) and a depth of 1.7 mm (=L1+L2) is formed in the mating surface of the female die 42. Further, a degassing pin 47 having a diameter D4 of 5 mm extends vertically through the female die 42, and its end face is exposed to be flush with the bottom face of the recess 46. The degassing pin 47 has a degassing hole (vent) extending centrally thereof. The degassing hole includes a hole 148 with a diameter D5 of 0.05 mm and a length of 1 mm, a hole 149 with a diameter D6 of 0.5 mm and a length of 9 mm, and a hole 150 with a diameter D7 of 1 mm and a length of 8 mm, which are arranged in this order from the upper side to the lower side and communicate with each other.

As shown in FIG. 49, the mating surface of the female die 42 is formed with a ring-shaped first gate half 49 coaxial with the recess 46, four second gates 50 extending radially from the recess 46 and connected to the first gate half 49, a sprue 51, and two runner halves 52 connecting the sprue 51 to the first gate half 49.

Correspondingly, as shown in FIG. 48, the mating surface of the male die 41 is formed with a ring-shaped first gate half 49*a* coaxial with the core pin 43, a sprue lock pin hole 51*a*, and two runner halves 52*a* connecting the sprue lock pin hole 51*a* to the first gate half 49*a*. As shown in FIG. 48, the male die 41 includes a sprue lock pin 53 inserted in the sprue lock pin hole 51*a* and eight ejector pins 54.

The male die 41 and the female die 42 respectively having the aforesaid constructions are combined together with their mating surfaces in contact with each other, and clamped by means of a clamping jig not shown. At this time, the core pin 43 is opposed to the degassing pin 47, and the first gate half 49 and the first gate half 49*a* are joined to define a tubular first gate. Further, the runner halves 52 and the runner halves 52*a* are joined to define tubular runners.

A thermoplastic molding material is heated at 200 to 280° C. by a heater not shown thereby to be fluidized. The fluidized molding material is injected into the recess (cavity) 46 through the sprue 51, the runners and the first and second gates at a pressure of about 50 to 150 MPa. Preferred examples of the molding material include ABS resins, POM resins, PP resins, acrylic resins and polycarbonate resins.

During the injection, air (gas) present in the recess (cavity) 46 is expelled through the degassing holes 148, 149, 150 formed in the degassing pin 47. Therefore, the molding material is smoothly filled in the recess (cavity) 46 through the first and second gates without local stagnation thereof.

After the injection is completed and the molding material is cooled to be solidified, the male die 41 and the female die 42 are separated by the claming jip, whereby the ejector pins 54 and the sprue lock pin 53 are projected from the mating surface of the male die 41. Thus, the resulting molded product is ejected. The pellet 33*b* shown in FIG. 39 is obtained by removing portions of the product molded in the second gates.

In this embodiment, the mold having the male die 41 and the female die 42 is adapted to mold the single pellet. However, the mold may be adapted for simultaneously molding a plurality of pellets (e.g., four pellets). In this case, the male die 41 includes a plurality of core pins 43 and a plurality of projections 44, 45, and the female die 42 includes a plurality of corresponding recesses (cavities) 46. Sprues, runners and gates for simultaneously supplying the molding material into the plurality of recesses 46 are provided in the mold. Although the thermoplastic resin is used as the molding material in this embodiment, a thermosetting resin may be employed for the molding of the pellet.

According to the first aspect of this invention, the partition member has the projecting portion which projects from the base around the through-hole, so that the sample is assuredly allowed to pass from the first channel to the second channel through the through-hole. Therefore, the measuring unit including the partition member ensures accurate sample analysis.

According to the second aspect of this invention, the partition member has the projecting portion which projects from the base around the through-hole, so that the sample is assuredly allowed to pass through the through-hole and the detection of the signal from the sample is assuredly performed in the detector.

According to the third and fourth aspects of this invention, the partition member can be produced with high accuracy and at low cost.

What is claimed is:

1. A measuring unit to be removably connected to a blood sample analyzer, the measuring unit comprising:

a first member having a first channel through which a blood sample is allowed to pass:

a second member having a second channel through which the blood sample is allowed to pass;

first and second electrodes provided in the first and second channels, respectively; and a partition member having a through-hole through which a blood cell contained in the blood sample is allowed to pass from the first channel to the second channel;

wherein the partition member comprises a base having the through-hole and a projecting portion which projects from the base around the through-hole, and wherein the base is integral with the projecting portion, and the base and the projecting portion are composed of a resin.

2. A measuring unit as set forth in claim 1, wherein one of the first and second members has a projection, and the projection is fitted in a space surrounded by the projecting portion around the through-hole.

3. A measuring unit as set forth in claim 1, wherein one of the first and second members has a first recess for receiving the partition member.

4. A measuring unit as set forth in claim 1, wherein the projecting portion has a ring shape.

5. A measuring unit as set forth in claim 1, wherein the projecting portion is located on a circle coaxial with the through-hole.

6. A measuring unit as set forth in claim 1, wherein the projecting portion projects axially of the through-hole.

7. A measuring unit as set forth in claim 1, wherein the base has a disk shape.

8. A measuring unit as set forth in claim 7, wherein the through-hole is provided at a center of the base.

9. A measuring unit as set forth in claim 1, wherein the base has a second recess, and the through-hole is provided in the second recess.

10. A measuring unit as set forth in claim 9, wherein the base comprises a front surface and a rear surface, and the projecting portion and the second recess are provided on the front surface.

11. A measuring unit as set forth in claim 1, wherein the base comprises a front surface and a rear surface, and the projecting portion is provided on the front surface, wherein the partition member further comprises a second projection portion provided on the rear surface.

12. A measuring unit as set forth in claim 1, wherein the first and second channels are partly coaxial with the through-hole.

13. A partition member provided in a detector for detecting a signal from a sample, the partition member comprising:

a base having a through-hole through which the sample is allowed to pass; and a projecting portion which projects from the base around the through-hole;

wherein the base is integral with the projecting portion, and the base and the projecting portion are composed of a resin, and wherein the projecting portion has a ring shape, and includes a tapered interior wall which has an inner diameter progressively decreasing toward a proximal edge thereof away from a distal edge thereof.

14. A partition member as set forth in claim 13, wherein the projecting portion has a ring shape.

15. A partition member as set forth in claim 14, wherein the projecting portion is located on a circle coaxial with the through-hole.

16. A partition member as set forth in claim 13, wherein the projecting portion projects axially of the through-hole.

17. A partition member as set forth in claim 13, wherein the base has a diskshape.

18. A partition member as set forth in claim 17, wherein the through hole is provided at a center of the base.

19. A partition member as set forth in claim 13, wherein the base has a recess and the through-hole is provided in the recess.

20. A partition member as set forth in claim 19, wherein the base comprises a front surface and a rear surface, and the projecting portion and the recess are provided on the front surface.

21. A partition member as set forth in claim 13, wherein the base comprises a front surface and a rear surface, and the projecting portion is provided on the front surface, the partition member further comprising a second projecting portion provided on the rear surface.

22. A partition member as set forth in claim 21, wherein the second projecting portion is integral with the base and the projecting portion and composed of the resin.

23. A partition member as set forth in claim 21, wherein the second projection portion has a ring shape, and projects from the base.

24. A partition member as set forth in claim 13, wherein the base and the projecting portion are integral with each other and composed of a resin.

25. A partition member as set forth in claim 13, wherein the sample is a blood sample.

26. The partition member as set forth in claim 13, wherein the detector comprises a measuring unit to be removably connected to a sample analyzer.

* * * * *